(12) United States Patent  (10) Patent No.: US 7,733,580 B2
Ieda et al.  (45) Date of Patent: Jun. 8, 2010

(54) LIGHT EMITTING MODULE AND LIGHT RECEIVING MODULE

(75) Inventors: Tomoaki Ieda, Osaka (JP); Hiroyuki Sasai, Osaka (JP)

(73) Assignee: Panasonic Corporation, Osaka (JP)

(*) Notice: Subject to any disclaimer, the term of this patent is extended or adjusted under 35 U.S.C. 154(b) by 66 days.

(21) Appl. No.: 11/934,315

(22) Filed: Nov. 2, 2007

(65) Prior Publication Data

US 2008/0106804 A1  May 8, 2008

(30) Foreign Application Priority Data

Nov. 6, 2006  (JP) .............................. 2006-300775
Apr. 23, 2007  (JP) .............................. 2007-113237

(51) Int. Cl.
*G02B 3/08*  (2006.01)

(52) U.S. Cl. ..................................... 359/742

(58) Field of Classification Search ................. 359/724, 359/737, 741, 742; 362/555, 299, 301, 302, 362/308, 309, 327, 328, 335–336
See application file for complete search history.

(56) References Cited

U.S. PATENT DOCUMENTS 6,755,556 B2 *  6/2004  Gasquet et al. ............. 362/329

7,160,522 B2 *  1/2007  Minano Dominguez et al. ......................... 362/336
2003/0147244 A1*  8/2003  Tenmyo ...................... 362/339
2006/0256433 A1*  11/2006  Yoshikawa et al. ........... 359/742

FOREIGN PATENT DOCUMENTS

| JP | 03-060080 | 3/1991 |
| JP | 2002-221605 | 8/2002 |
| JP | 2005-049367 | 2/2005 |
| JP | 2006-177999 | 7/2006 |

* cited by examiner

*Primary Examiner*—Alicia M Harrington
(74) *Attorney, Agent, or Firm*—Wenderoth, Lind & Ponack, L.L.P.

(57) ABSTRACT

A plurality of first refraction surfaces 121 and a plurality of second refraction surfaces 122 are alternately provided on an emission surface of a lens element 120 so as to form concentric circles each having an optical axis 113 at the center thereof, and having diameters different from each other, and a light reflected by a plurality of reflection surfaces 123 provided on an incident surface of the lens element so as to form concentric circuits each having the optical axis 113 at the center thereof and having diameters different from each other, is refracted and emitted by the plurality of second refraction surfaces 122 at desired angles. Therefore, it is possible to enhance efficiency and an emission intensity, and reduce variations in brightness of an emitted light without increasing the diameter of the lens element 120, thereby realizing a light emitting module 100 enabling advantageous performance.

22 Claims, 25 Drawing Sheets

LIGHT EMITTING MODULE AND LIGHT RECEIVING MODULE

BACKGROUND OF THE INVENTION

1. Field of the Invention

The present invention relates to a light emitting module and a light receiving module for use in, for example, an optical wireless transmitter and an optical wireless receiver, respectively, of an optical wireless transmission system for transmitting information data such as a video signal, an audio signal, and a digital data signal, as an optical signal through a free space, and more particularly to a light emitting module which allows reduction of variations in brightness of an emitted light and enhancement of efficiency, and a light receiving module having enhanced light collection efficiency.

2. Description of the Background Art

An optical wireless transmission system for transmitting an optical signal through a free space has advantageous characteristics that transmission can be performed at a higher speed than radio transmission using a radio wave because a light enables a broadband transmission. In order to incorporate, in a mobile device, an optical wireless transmitter and an optical wireless receiver of the optical wireless transmission system, it is necessary to reduce the thickness and the size of each of a light emitting module and a light receiving module for use therein.

For some conventional light emitting module, a Fresnel lens is used so as to change an emission angle of a light emitted from a light source, thereby realizing reduction of the thickness thereof (see, for example, Japanese Laid-Open Patent Publication No. 2005-49367). FIG. 27 is a diagram illustrating a conventional light emitting module disclosed in Japanese Laid-Open Patent Publication No. 2005-49367.

As shown in FIG. 27, a light emitting module 10 includes a light source 1 and a lens 2. The lens 2 has, on an emission surface thereof, a plurality of refraction surfaces 3 provided so as to form concentric circles each having an optical axis at the center thereof and having diameters different from each other such that the lens 2 acts as a Fresnel lens, and therefore the lens 2 refracts a light emitted from the light source 1 so as to emit a light substantially parallel to the optical axis 4. The Fresnel lens is allowed to have a lens portion thinner than a spherical lens having a continuous curved surface, and a non-spherical lens, that is, the lens portion of the Fresnel lens is allowed to have its thickness reduced to that of a plate. In other words, the Fresnel lens has a characteristic that the thickness of the Fresnel lens can be easily reduced. However, due to, for example, limitations in processing the plurality of refraction surfaces 3 so as to make inclination angles thereof, the Fresnel lens is configured such that a reception angle $2\beta$ at which a light emitted from the light source 1 is received has only a limited value. Therefore, when an angle at which the light source 1 emits a light is large, the light emitting module 10 may not efficiently emit the light.

Further, Japanese Laid-Open Patent Publication No. 2005-49367 discloses that a range of the reception angles at which a light emitted from the light source 1 is received is increased. FIG. 28 is a diagram illustrating another conventional light emitting module 11, which is disclosed in Japanese Laid-Open Patent Publication No. 2005-49367.

As shown in FIG. 28, the light emitting module 11 includes a light source 1 and a lens 12. The lens 12 has, on an emission surface thereof, a plurality of refraction surfaces 13 which are similar to the plurality of refraction surfaces 3 of the lens 2 shown in FIG. 27, and has, on an incident surface thereof, a plurality of reflection surfaces 15 which are provided so as to form concentric circles each having an optical axis at the center thereof and having diameters different from each other. A portion of a light having been emitted from the light source 1 at an emission angle larger than $2\beta$ is reflected by the plurality of reflection surfaces 15, so as to be emitted from a plane portion 16 of the emission surface of the lens 2.

On the other hand, some conventional light receiving module for converting an incident light to an electrical signal incorporates a Fresnel lens as a collecting lens for collecting the incident light on a light receiving element, thereby reducing the thickness thereof (see, for example, Japanese Laid-Open Patent Publication No. 3-60080). FIG. 30 is a diagram illustrating a conventional light receiving module 20 as disclosed in Japanese Laid-Open Patent Publication No. 3-60080.

As shown in FIG. 30, the light receiving module 20 includes a collecting lens 21 and a light receiving element 22. The collecting lens 21 acts as a Fresnel lens having, on an incident surface thereof, a plurality of refraction surfaces 23 which are provided so as to form concentric circles each having an optical axis at the center thereof, and having diameters different from each other. The collecting lens 21 collects an incident light on the light receiving element 22. The collecting lens 21 acting as the Fresnel lens is allowed to have its thickness reduced as compared to a convex lens of a spherical surface, and the like.

FIG. 29 is an enlarged view of the A1 portion of the light emitting module 11 of the conventional configuration shown in FIG. 28. As shown in 29, the plurality of refraction surfaces 13 each has, at the tip thereof, a lens invalid portion which prevents a light emitted from the light source 1 from passing therethrough. Therefore, a dark portion preventing the light from passing therethrough occurs. Therefore, the light emitting module 11 has a problem that a light emitted from the lens 12 has variations in brightness.

Further, the conventional light emitting module 11 as shown in FIG. 28 emits a light reflected by the plurality of reflection surfaces 15, from the plane portion 16 of the emission surface, and the plane portion 16 corresponds to a portion outward from the outermost circumference of the plurality of refraction surfaces 13. Therefore, the diameter d2 of the plurality of reflection surfaces 15 needs to be larger than the diameter d1 of the plurality of refraction surfaces 13, thereby increasing the diameter of the lens 12.

Further, FIG. 31 is an enlarged view of the A2 portion of the conventional light receiving module 20 as shown in FIG. 30. As shown in FIG. 31, the plurality of refraction surfaces 23 each has, at the tip thereof, a lens invalid portion on which collection of an incident light is prevented. Therefore, the light receiving module 20 has a problem that light collecting efficiency is reduced due to an area in which no incident light is collected.

SUMMARY OF THE INVENTION

Therefore, the first object of the present invention is to provide a light emitting module capable of reducing variations in brightness of an emitted light and enhancing efficiency while minimizing a diameter of a lens. Further, the second object of the present invention is to provide a light receiving module capable of enhancing light collecting efficiency while minimizing a diameter of a lens.

In order to attain the first object, the present invention is directed to a light emitting module comprising a light source and a lens element for changing a light from the light source so as to have a predetermined directivity, in which the lens element includes: a plurality of first refraction surfaces, provided on an emission surface of the lens element so as to form concentric circles each having an optical axis at the center thereof, and having diameters different from each other, operable to refract a first emission light which is emitted from the light source at an emission angle, ranging from zero to $\theta_0$, representing an angle between the optical axis and a direction in which the first emission light is emitted, so as to emit the first emission light at a predetermined angle; a light direction section operable to direct, to the emission surface of the lens element, a second emission light which is emitted from the light source at an emission angle, larger than $\theta_0$, representing an angle between the optical axis and a direction in which the second emission light is emitted; and a plurality of second refraction surfaces, provided on the emission surface of the lens element so as to form concentric circles each having the optical axis at the center thereof, and having diameters different from each other, operable to refract the second emission light directed by the light direction section, so as to emit the second emission light at a predetermined angle, and the plurality of second refraction surfaces and the plurality of first refraction surfaces are alternately provided on the emission surface of the lens element.

Preferably, the light direction section is a reflection section operable to reflect the second emission light emitted from the light source.

Preferably, the reflection section includes at least one total reflection surface.

Preferably, the reflection section is a single reflection surface which interacts with at least one of the plurality of second refraction surfaces, or the reflection section is a plurality of reflection surfaces provided on an incident surface of the lens element so as to form concentric circles each having the optical axis at the center thereof, and having diameters different from each other, and the plurality of reflection surfaces interact with the plurality of second refraction surfaces in a substantially one-to-one corresponding manner.

Preferably, the light emitting module further comprises a reflector for directing, to the light direction section, the second emission light emitted from the light source.

Preferably, the reflector reflects an emission light which is emitted at an emission angle, ranging from $\theta_2$ to $\theta_3$, representing an angle between the optical axis and a direction in which the emission light is emitted, among the second emission light emitted from the light source, the emission light being prevented from directly reaching the lens element.

Preferably, the light direction section is a single refraction surface which interacts with at least one of the plurality of second refraction surfaces, or the light direction section is a plurality of refraction surfaces provided on an incident surface of the lens element so as to form concentric circles having the optical axis at the center thereof, and having diameters different from each other, and the plurality of refraction surfaces interact with the plurality of second refraction surfaces in a substantially one-to-one corresponding manner.

Preferably, a distance between the optical axis and an outermost circumference of the light direction section is smaller than or equal to a distance between the optical axis and an outermost circumference of the plurality of first refraction surfaces.

Preferably, the plurality of second refraction surfaces have such a shape as to remove, from the emission surface of the lens element, an invalid portion for preventing emission of an emission light emitted by the light source.

In order to attain the second object, the present invention is directed to a light receiving module comprising a light receiving element and a lens element for collecting a light on the light receiving element, in which the lens element includes: a plurality of first refraction surfaces, provided on an incident surface of the lens element so as to form concentric circles each having an optical axis at the center thereof, and having diameters different from each other, operable to refract one portion of an incident light so as to collect the incident light on the light receiving element; a plurality of second refraction surfaces, provided on the incident surface of the lens element so as to form concentric circles each having the optical axis at the center thereof, and having diameters different from each other, operable to refract the other portion of the incident light, and the plurality of second refraction surfaces and the plurality of first refraction surfaces are alternately provided on the incident surface of the lens element; and a light direction section, provided at such a position as to prevent a light, which is refracted by the plurality of first refraction surfaces so as to be collected on the light receiving element, from passing therethrough, operable to collect, on the light receiving element, a light refracted by the plurality of second refraction surfaces.

Preferably, the light direction section is a reflection section operable to reflect the light refracted by the plurality of second refraction surfaces.

Preferably, the reflection section includes at least one total reflection surface.

Preferably, the reflection section is a single reflection surface which interacts with at least one of the plurality of second refraction surfaces, or the reflection section is a plurality of reflection surfaces provided on an emission surface of the lens element so as to form concentric circles each having the optical axis at the center thereof, and having diameters different from each other, and the plurality of reflection surfaces interact with the plurality of second refraction surfaces in a substantially one-to-one corresponding manner.

Preferably, the light receiving module further comprises a reflector for collecting, on the light receiving element, the light directed by the light direction section.

Preferably, the light direction section is a refraction section for refracting the light refracted by the plurality of second refraction surfaces.

Preferably, the refraction section is a single third refraction surface which interacts with at least one of the plurality of second refraction surfaces, or the refraction section is a plurality of third refraction surfaces provided on an emission surface of the lens element so as to form concentric circles each having the optical axis at the center thereof, and having diameters different from each other, and the plurality of third refraction surfaces interact with the plurality of second refraction surfaces in a substantially one-to-one corresponding manner.

Preferably, a distance between the optical axis and an outermost circumference of the light direction section is smaller than or equal to a distance between the optical axis and an outermost circumference of the plurality of first refraction surfaces.

Preferably, the plurality of second refraction surfaces have such a shape as to remove, from the incident surface of the lens element, an invalid portion for preventing the incident light from being collected on the light receiving element.

As described above, the light emitting module according to the present invention allows reduction of variations in brightness of an emitted light, and enhancement of efficiency while minimizing the diameter of the lens. Further, the light receiving module according to the present invention allows enhancement of light collection efficiency while minimizing the diameter of the lens.

These and other objects, features, aspects and advantages of the present invention will become more apparent from the

DESCRIPTION OF THE PREFERRED EMBODIMENTS

Hereinafter, embodiments of the present invention will be described with reference to the drawings.

First Embodiment

Figure 1:
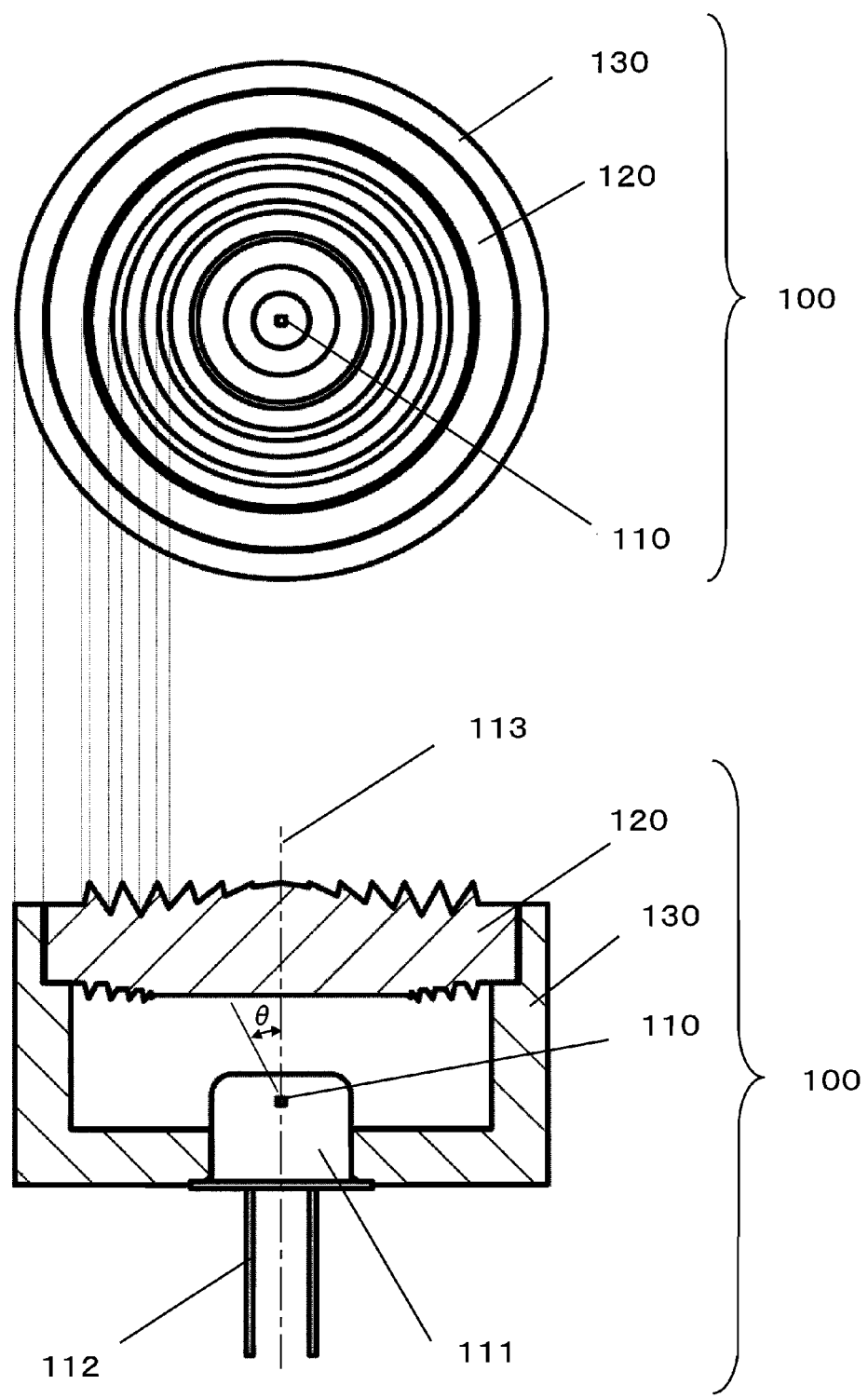
FIG. 1 is a top view and a side cross-sectional view of a light emitting module according to a first embodiment of the present invention.
Figure 2:
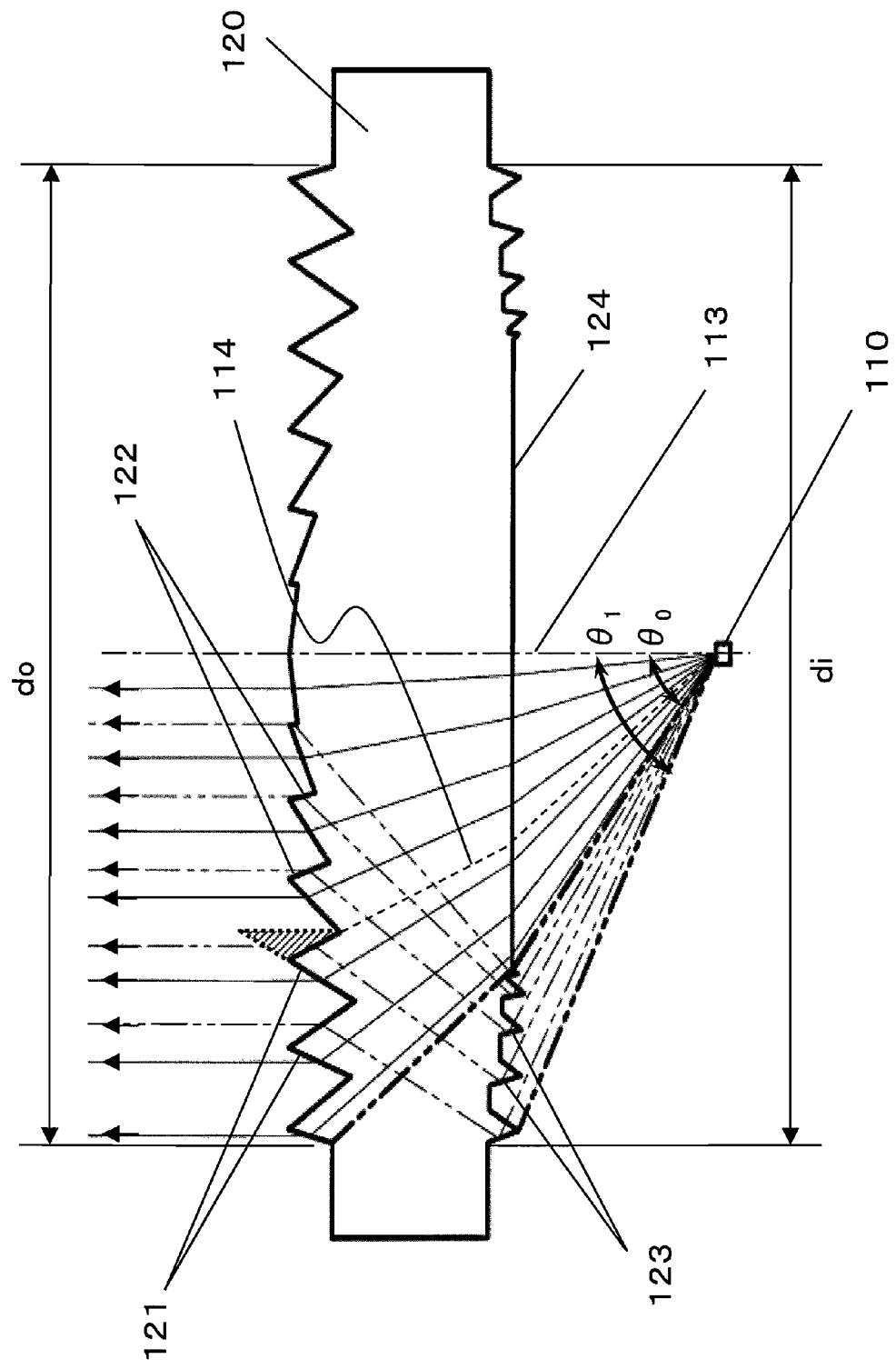
FIG. 2 is a side cross-sectional view of a principal portion of the light emitting module according to the first embodiment of the present invention.

FIG. 1 is a top view and a side cross-sectional view of a light emitting module 100 according to a first embodiment of the present invention. FIG. 2 is a side cross-sectional view of a principal portion of the light emitting module 100 according to the first embodiment of the present invention.

As shown in FIG. 1 and FIG. 2, the light emitting module 100 mainly comprises a light source 110 and a lens element 120. As the light source 110, for example, a LED or a semiconductor laser is used. The light source 110 is accommodated in a package 111. The package 111 and the lens element 120 are fixed, in a housing 130, at such positions as to satisfy a predetermined positional relationship therebetween. A modulated electrical signal is supplied to the light source 110 through a terminal 112, and the light source 110 emits a light signal having, for example, its light emission intensity varied in accordance with the modulated signal, so as to spread out the light signal from an optical axis 113. For example, when a LED is used as the light source 110, a light emitted from the light source 110 spreads so as to substantially represent a Lambertian distribution in which an emission intensity is proportional to cos θ where θ represents an emission angle representing an angle between the optical axis 113 and an emission direction.

Figure 27:
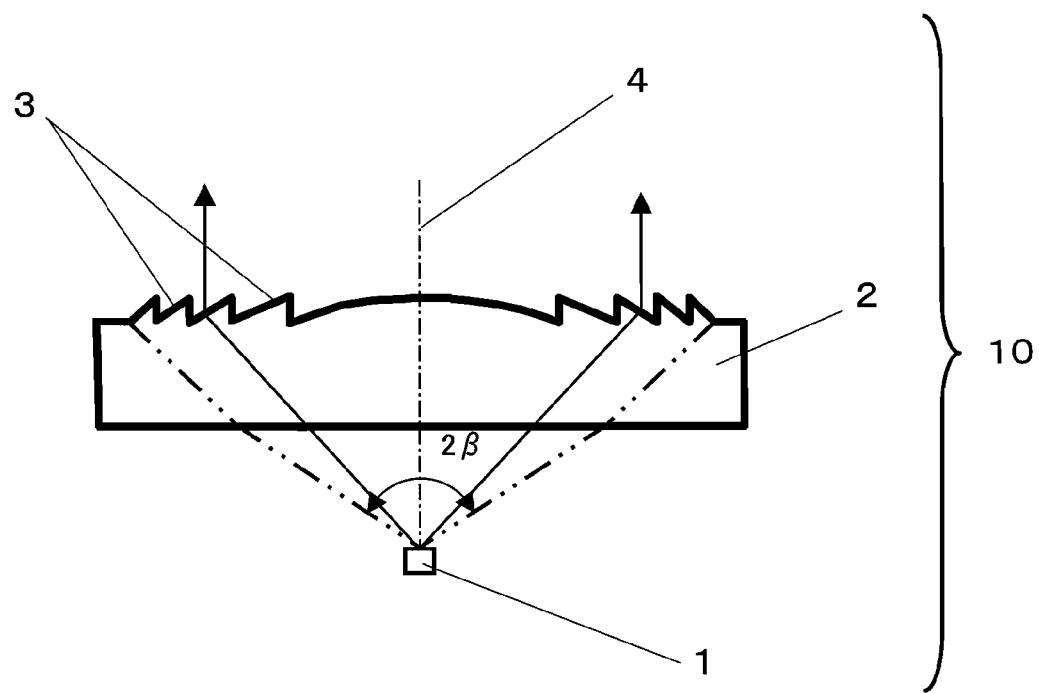
FIG. 27 is a side cross-sectional view of a conventional light emitting module.

The lens element 120 is used to change an angle at which a light from the light source 110 is spread, to an appropriate spread angle. An emitted light signal is received by an optical wireless receiver (not shown) provided so as to face the light emitting module 100, thereby realizing optical wireless transmission of information data. When too wide spread of the light emitted from the light emitting module 100 leads to reduction in density of a radiation power, the optical wireless transmission system provides only a reduced transmission distance. Therefore, the lens element 120 is designed so as to mainly reduce, to a predetermined angle, a spread angle at which a light emitted from the light source 110 is spread, and emit a light at the predetermined angle. As shown in FIG. 2, the lens element 120 has, on an emission surface thereof, a plurality of first refraction surfaces 121 which are provided so as to form concentric circles each having the optical axis 113 at the center thereof, and having diameters different from each other. The plurality of first refraction surfaces 121 each refract a light which is emitted from the light source 110 at an angle smaller than or equal to $\theta_0$, and emit the light in a direction represented by a desired angle. FIG. 2 shows, as a simple example, a case where the light emitted from the light source 110 is changed to a light parallel to the optical axis 113. That is, the plurality of first refraction surfaces 121 act as a typical Fresnel lens. Therefore, the plurality of first refraction surfaces 121 act in the same manner as the conventional light emitting module shown in FIG. 27 and FIG. 28.

Next, a difference between a conventional light emitting module and the light emitting module 100 according to the first embodiment of the present invention will be described. The lens element 120 of the light emitting module 100 according to the first embodiment of the present invention has a plurality of second refraction surfaces 122 formed on the emission surface thereof, in addition to the lens of the conventional light emitting module. Further, a plurality of reflection surfaces 123 are formed as a light direction section for directing, toward the plurality of second refraction surfaces 122, a light emitted from the light source 110 at an emission angle, greater than $\theta_0$, representing an angle between the optical axis 113 and the emission direction.

Figure 28:
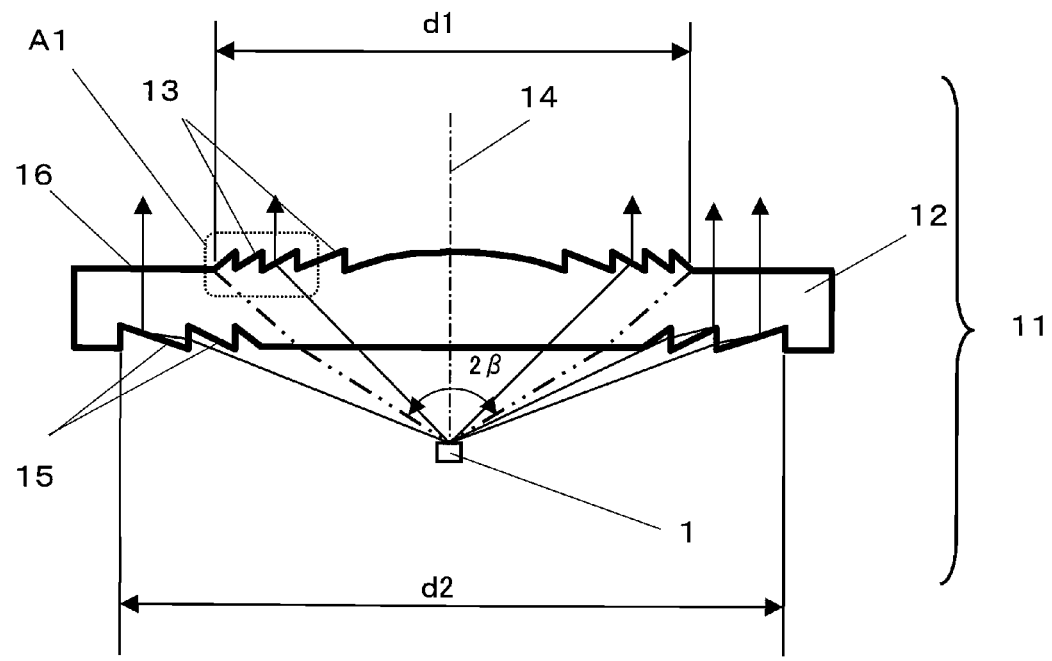
FIG. 28 is a side cross-sectional view of a conventional light emitting module.
Figure 29:
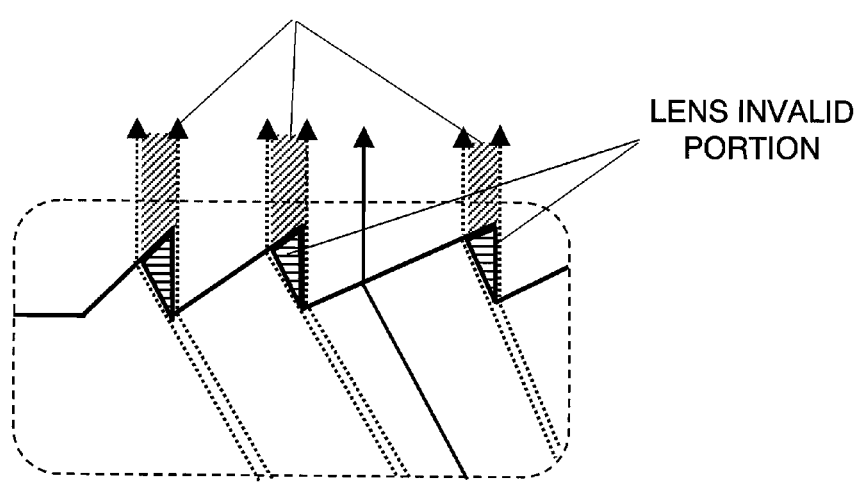
FIG. 29 is an enlarged side cross-sectional view of the A1 portion of the conventional light emitting module shown in FIG. 28.

The plurality of second refraction surfaces 122 and the plurality of first refraction surfaces 121 are alternately provided on the emission surface of the lens element 120 so as to form concentric circles each having the optical axis 113 at the center thereof. Lens surfaces of the plurality of second refraction surfaces 122 have such a shape as to prevent the lens element 120 from including a lens invalid portion (corresponding to diagonal line portions in FIG. 2) of the lens 12 of the conventional light emitting module as shown in FIG. 28 and FIG. 29. That is, the lens element 120 does not include an invalid portion which prevents emission of a light emitted from the light source 110.

The plurality of reflection surfaces 123 are provided on an incident surface of the lens element 120 so as to form concentric circles each having the optical axis 113 at the center thereof, and having diameters different from each other. Further, the plurality of reflection surfaces 123 are a plurality of total reflection surfaces. Further, the plurality of reflection surfaces 123 are provided so as to receive a light emitted from the light source 110 at an emission angle greater than $\theta_0$. A light emitted from the light source 110 at an emission angle smaller than or equal to $\theta_0$ is refracted by the plurality of first refraction surfaces 121, and emitted from the lens element 120. Therefore, when a light emitted from the light source 110 at the emission angle smaller than or equal to $\theta_0$ is emitted from the lens element 120, no loss of light occurs. The plurality of reflection surfaces 123 interact with the plurality of second refraction surfaces 122 in a substantially one-to-one corresponding manner, and therefore a light emitted from the light source 110 at an emission angle ranging from $\theta_0$ to $\theta_1$ is reflected toward the plurality of second refraction surfaces 122 in accordance with the one-to-one correspondence. The plurality of second refraction surfaces 122 refract the reflected light and emit the refracted light from the lens element 120. In this case, angles of the plurality of reflection surfaces 123 are set such that the light is emitted from the lens element 120 at desired angles (in FIG. 2, such that the light is emitted parallel to the optical axis 113).

As described above, the plurality of second refraction surfaces 122 and the plurality of reflection surfaces 123 are formed such that a light emitted from the light source 110 at the emission angle ranging from $\theta_0$ to $\theta_1$ is emitted from a portion corresponding to the dark portion shown in FIG. 29, thereby reducing variations in brightness of the emitted light. Further, not only a light emitted from the light source 110 at the emission angle smaller than or equal to $\theta_0$ but also a light emitted from the light source 110 at the emission angle ranging from $\theta_0$ to $\theta_1$ is emitted from an area of diameter do of the plurality of first refraction surfaces 121, thereby enhancing a density of a radiation power within the area of the diameter do and realizing the light emitting module 100 enabling efficient performance. Further, when a distance between the optical axis 113 and the outermost circumference of the plurality of reflection surfaces 123 is smaller than or equal to the distance between the optical axis 113 and the outermost circumference of the plurality of first refraction surfaces 121 (that is, the diameter di is smaller than or equal to the diameter do), it is possible to enhance efficiency and an intensity of a light emitted from the light emitting module 100, as compared to a conventional typical Fresnel lens, without increasing the diameter of the lens element 120. More specifically, the conventional light emitting module 11 shown in FIG. 28 needs to have the diameter of the lens 12 increased, because a light reflected by the plurality of reflection surfaces 15 is emitted from the emission surface corresponding to the portion outward from the outermost circumference of the plurality of refraction surfaces 13 (that is, from an area outside the diameter d1). On the other hand, according to the first embodiment, a light reflected by the plurality of reflection surfaces 123 is emitted from the plurality of second refraction surfaces 122, respectively, configured such that the distance between the optical axis 113 and the outermost circumference of the plurality of second refraction surfaces 122 is smaller than the distance between the optical axis 113 and the outermost circumference (edges of diameter do) of the plurality of first refraction surfaces 121. Therefore, it is possible to enhance the efficiency without increasing the diameter of the lens element 120.

As described above, according to the first embodiment, the plurality of first refraction surfaces 121 and the plurality of second refraction surfaces 122 are alternately provided on the emission surface of the lens element 120 so as to form concentric circles each having the optical axis 113 at the center thereof, and having diameters different from each other, and the plurality of reflection surfaces 123 are provided on the incident surface of the lens element 120 so as to form concentric circles each having the optical axis 113 at the center thereof, and having diameters different from each other, and a light reflected by the plurality of reflection surfaces 123 is refracted and emitted by the plurality of second refraction surfaces 122, respectively, at desired angles. Therefore, it is possible to reduce variations in brightness of the emitted light, and enhance efficiency and an emission intensity, without increasing the diameter of the lens element 120, thereby realizing the light emitting module 100 enabling advantageous performance.

Although in the above description the plurality of reflection surfaces 123 interact with the plurality of second refraction surfaces 122 in a substantially one-to-one corresponding manner, the plurality of reflection surfaces 123 may interact with at least one of the plurality of second refraction surfaces 122. Also in this case, as compared to the conventional light emitting module, it is possible to reduce variations in brightness of a light emitted from the lens element 120, and enhance efficiency and an emission intensity, without increasing the diameter of the lens element 120, thereby realizing the light emitting module 100 enabling advantageous performance.

Figure 3:
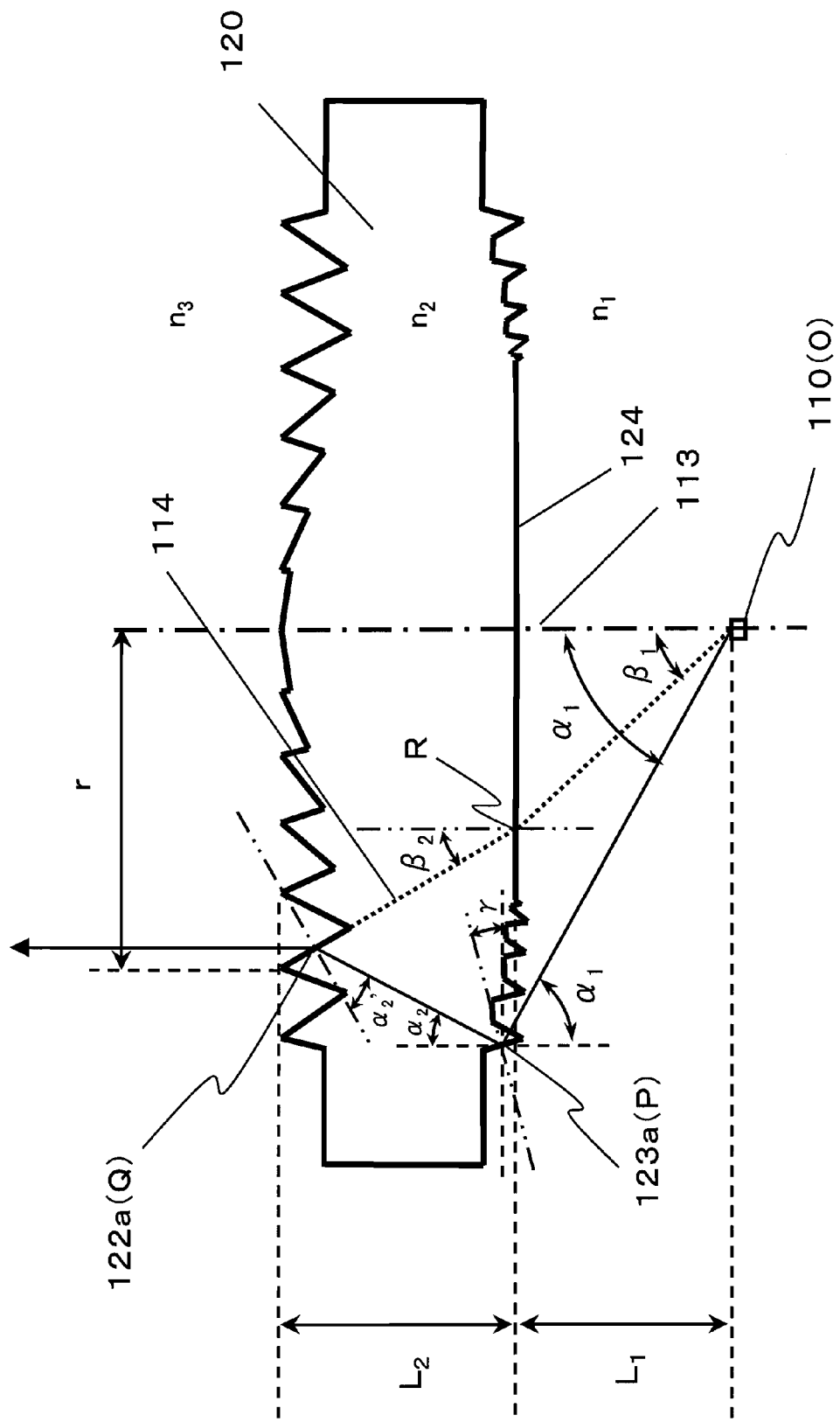
FIG. 3 is a side cross-sectional view of a principal portion of the light emitting module according to the first embodiment of the present invention.

Next, angles of the lens surfaces of the plurality of second refraction surfaces 122 and the plurality of reflection surfaces 123 will be described in more detail. FIG. 3 is a side cross-sectional view of a principal portion of the light emitting module 100, as shown in FIG. 2, according to the first embodiment. A reflection surface 123a by which a light emitted from the light source 110 at an emission angle $\alpha_1$ is reflected, and a second refraction surface 122a toward which the reflected light is directed will be described below in detail.

As shown in FIG. 3, the second refraction surface 122a is provided so as to be inclined along a ray 114 obtained by refracting a light emitted from the light source 110, at a point R on the incident surface 124 of the lens element, and passing the refracted light through the lens element 120. The second refraction surface 122a has such a shape as to include no lens invalid portion as described above. A light emitted from the light source 110 at the emission angle $\alpha_1$ representing an angle between the optical axis 113 and the emission direction is reflected at a reflection point P on the reflection surface 123a. The reflected light is directed toward the second refraction surface 122a, refracted at a refraction point Q on the second refraction surface 122a, and emitted as an emission light in the direction parallel to the optical axis 113.

$n_1$ represents a light refraction index between the light source 110 and the lens element 120, $n_2$ represents a light refraction index of the lens element 120, and $n_3$ represents a light refraction index between the lens element 120 and an optical wireless receiver (not shown). When the lens element is situated in the air, each of the refraction indexes $n_1$ and $n_3$ is almost one. $\beta_1$ represents an angle between the ray 114 and the optical axis 113 at a point O corresponding to a position of the light source 110. $\beta_2$ represents an angle, at the point R of the lens element 120, between the ray 114 and a line (in the present embodiment, a line parallel to the optical axis 113 because the incident surface 124 is a plane) normal to the incident surface 124. r represents a length of a line, normal to the optical axis 113, extending from an apex of a projection of the emission surface of the lens element 120 including the second refraction surface 122a, $L_1$ represents a length of a line, normal to the incident surface 124, extending from the light source 110, and $L_2$ represents a length of a line, normal to the incident surface 124, extending from the apex of the projection of the emission surface of the lens element 120 including the second refraction surface 122a. In this case, equations (1) and (2) are satisfied.

$$r = L_1 \cdot \tan\beta_1 + L_2 \cdot \tan\beta_2 \quad (1)$$

$$n_1 \cdot \sin\beta_1 = n_2 \cdot \sin\beta_2 \quad (2)$$

Thus, the angle $\beta_2$ of the second refraction surface 122a is determined based on the lengths r, $L_1$, and $L_2$.

Further, $\alpha_2$ represents an angle, at the reflection point P, between a line parallel to the optical axis 113, and a reflected light obtained by reflecting, at the reflection point P, a light emitted from the light source 110 at the emission angle $\alpha_1$. $\alpha_2'$ represents an angle, at the refraction point Q, between a light reflected at the reflection point P and a line normal to the second refraction surface 122a. $\gamma$ represents an angle, at the reflection point P, between a line parallel to the incident surface 124 and a line normal to the reflection surface 123a. In this case, equations (3) to (5) are satisfied.

$$n_3 \cdot \sin(\pi/2 - \beta_2) = n_2 \cdot \sin\alpha_2' \quad (3)$$

$$\alpha_2 = \pi/2 - \beta_2 - \alpha_2' \quad (4)$$

$$\gamma = (\alpha_1 - \alpha_2)/2 \quad (5)$$

Thus, the angle $\gamma$ of the reflection surface 123a is determined based on the emission angle $\alpha_1$ of the light emitted from the light source 110.

Further, when the following equation (6) is satisfied, the plurality of reflection surfaces 123 can be formed as a plurality of total reflection surfaces. When equation (6) is not satisfied, the plurality of reflection surfaces 123 may be, for example, metal-plated so as to obtain the plurality of reflection surfaces 123 enabling a desired performance.

$$n_2 \cdot \sin\{(\pi - \alpha_1 - \alpha_2)/2\} \geq n_1 \quad (6)$$

Figure 4:
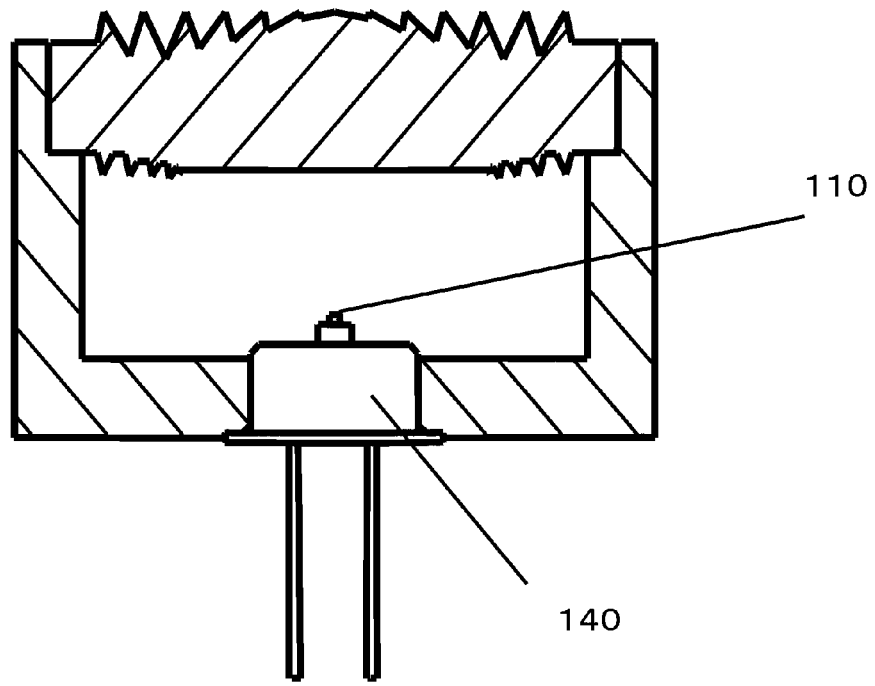
FIG. 4 is a side cross-sectional view of an exemplary modification of the light emitting module according to the first embodiment of the present invention.

According to the first embodiment shown in FIG. 1, the light emitting module 100 is configured such that the light source 110 is accommodated in the package 111, and the package 111 and the lens element 120 are fixed to the housing 130. However, it should be understood that any other configuration in which the aforementioned relationship is satisfied may be used to produce the same effect as described above. For example, as shown in FIG. 4, the package 111 of the light emitting module 100 as shown in FIG. 1 may be replaced with a package 140, and the light source 110 may be fixedly provided on the package 140.

Figure 5:
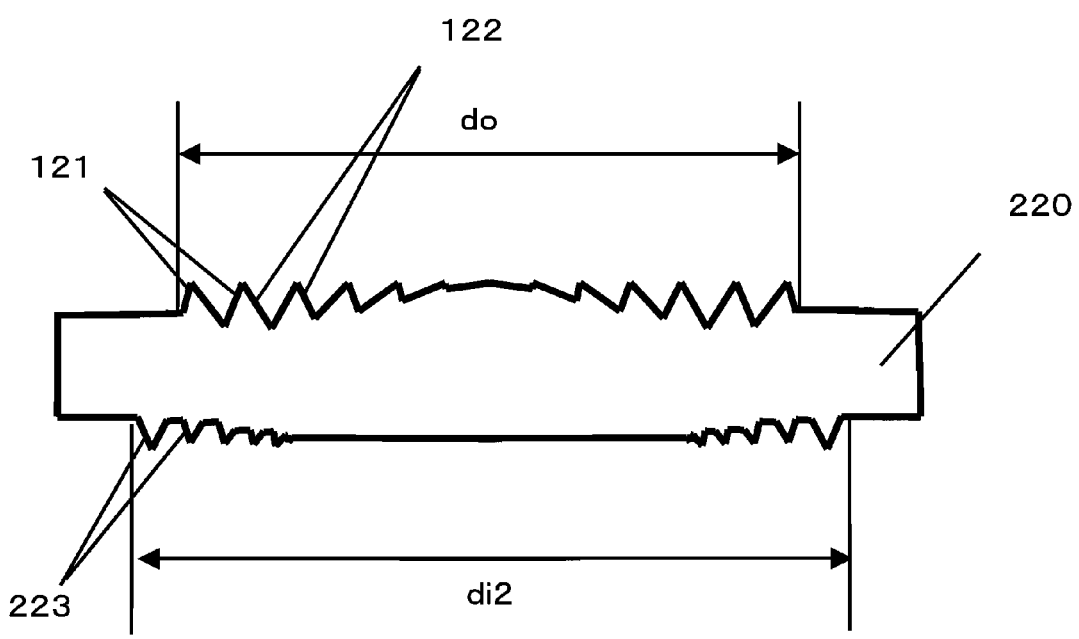
FIG. 5 is a side cross-sectional view of an exemplary modification of a lens element according to the first embodiment of the present invention.

Further, according to the first embodiment, the lens element 120 is configured such that the distance between the optical axis 113 and the outermost circumference of the plurality of reflection surfaces 123 is smaller than or equal to the distance between the optical axis 113 and the outermost circumference of the plurality of first refraction surfaces 121 (that is, the diameter di is smaller than or equal to the diameter do), thereby preventing increase of the diameter of the lens element 120. The present invention is not limited thereto. As shown in FIG. 5, a lens element 220 in which a distance between the optical axis 113 and the outermost circumference of a plurality of reflection surfaces 223 is larger than a distance between the optical axis 113 and the outermost circumference of the plurality of first refraction surfaces 121 (that is, the diameter di2 is larger than the diameter do), may be used. The configuration of the lens element 220 allows enhancement of efficiency and an emission intensity and allows reduction of variations in brightness of the emitted light while minimizing the diameter of the lens. It should be understood that the plurality of second refraction surfaces 122 and the plurality of reflection surfaces 223, both of which are included in the lens element 220, satisfy equations (1) to (6) as described above, as with the lens element 120 shown in FIG. 3.

Further, according to the first embodiment, the lens element 120 is configured such that the incident surface 124 on which a light emitted from the light source 110 at the emission angle smaller than or equal to $\theta_0$ is incident is a plane. However, the incident surface may be curved, that is, the incident surface may be, for example, an incident surface 324 of a lens element 320 shown in FIG. 6. The lens element 320 is allowed to produce the same effect as described above when a plurality of first refraction surfaces 321 and a plurality of second refraction surfaces 322 are alternately provided on the emission surface of the lens element 320, and the plurality of second refraction surfaces 322 refract and emit a reflected light from a plurality of reflection surfaces 323 provided on the incident surface of the lens element 320. Alternatively, the incident surface 324 may be a Fresnel lens surface. When the incident surface 324 of the lens element 320 has a spherical surface of a sphere having the light source 110 at the center thereof, the incident surface 324 does not refract a light emitted from the light source 110, and therefore a relationship between angles $\beta_1$ and $\beta_2$ shown in FIG. 3 satisfies $\beta_1=\beta_2$. Therefore, the plurality of second refraction surfaces 322 and the plurality of reflection surfaces 323, both of which are included in the lens element 320, satisfy equations (1) to (6) described above so as to satisfy $\beta_1=\beta_2$. Also when the incident surface 324 has another curved surface or a Fresnel lens surface, substitution into equation (2) may be performed depending on the refraction at the incident surface 324.

Further, according to the first embodiment, the plurality of reflection surfaces 123 are provided. However, a lens element 420 shown in FIG. 7 may be used in which a single reflection surface 423 is provided instead of the plurality of reflection surfaces 123. In this case, a plurality of second refraction surfaces 422 may be each designed so as to have an appropriate angle with respect to the single reflection surface 423. Also in this case, it is possible to reduce variations in brightness of the emitted light, and enhance efficiency and an emission intensity, thereby producing the same effect as described above.

Figure 7:
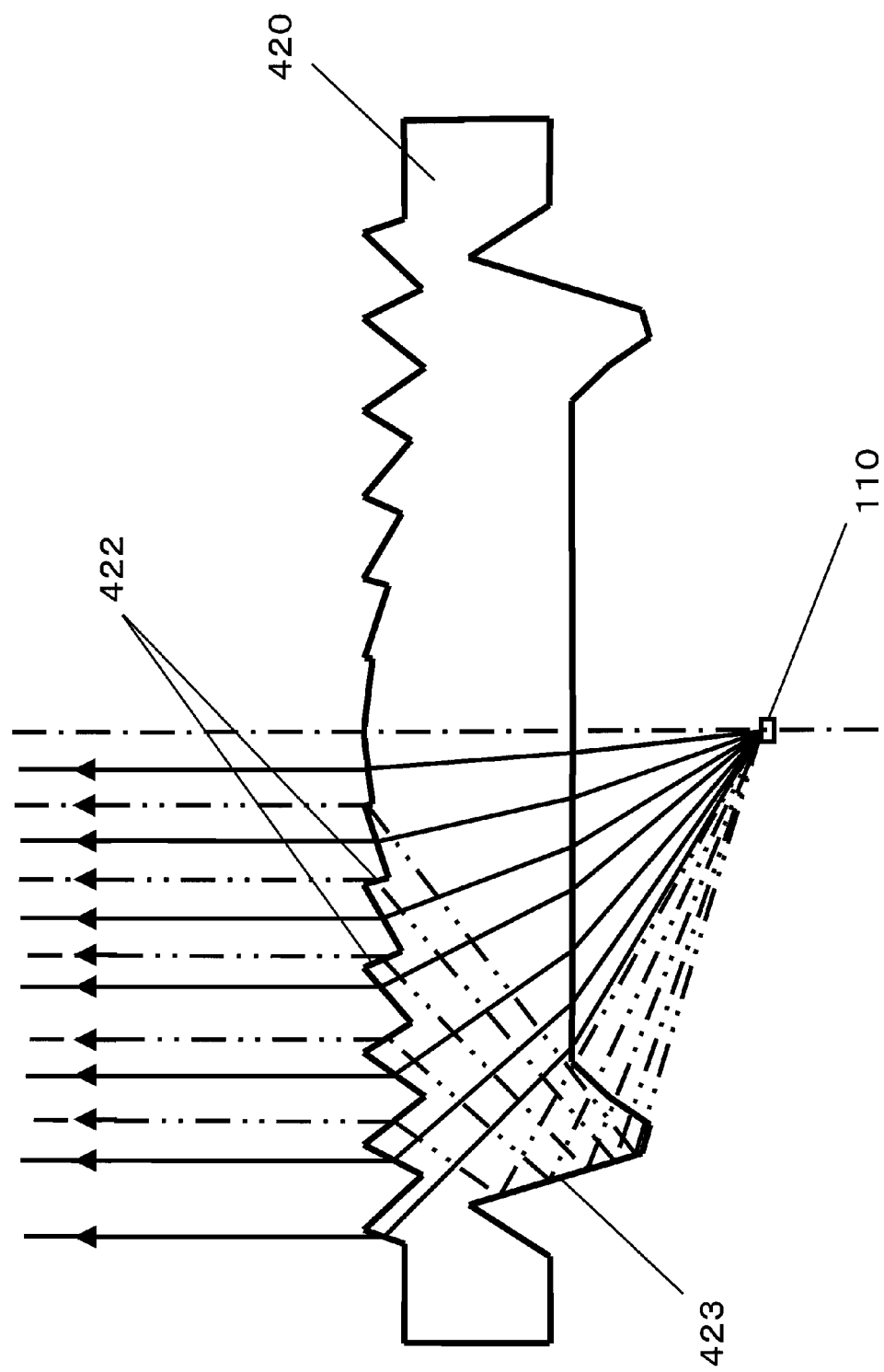
FIG. 7 is a side cross-sectional view of a principal portion of an exemplary modification of the light emitting module according to the first embodiment of the present invention.
Figure 8:
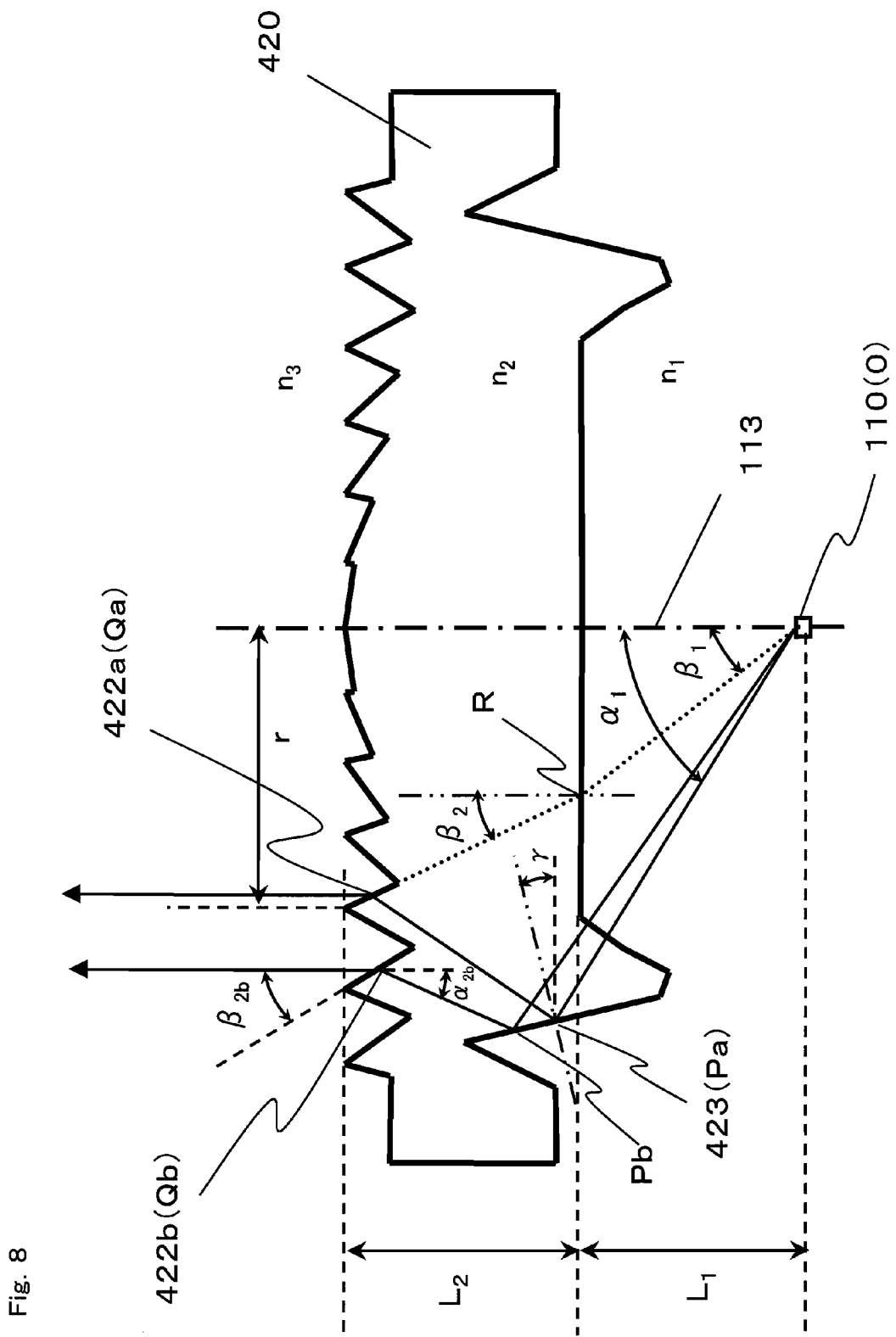
FIG. 8 is a side cross-sectional view of a principal portion of an exemplary modification of the light emitting module according to the first embodiment of the present invention.

Next, an angle of a lens surface of the single reflection surface 423 and angles of lens surfaces of the plurality of second refraction surfaces 422 will be described in more detail. FIG. 8 is a side cross-sectional view of a principal portion of a light emitting module as shown in FIG. 7 in which the lens element 420 is applied to the light emitting module 100 of the first embodiment. In FIG. 8, components common to those shown in FIG. 3 are denoted by the same corresponding reference numerals, and the description thereof is not given.

As shown in FIG. 8, a light emitted from the light source 110 at an emission angle $\alpha_1$ representing an angle between the optical axis 113 and the emission direction is reflected at a first reflection point Pa on the reflection surface 423. The reflected light is directed to a second refraction surface 422a, refracted at a first refraction point Qa on the second refraction surface 422a, and emitted as an emission light in the direction parallel to the optical axis 113. A relationship between the second refraction surface 422a and the reflection surface 423 is the same as the relationship, as described with reference to FIG. 3, between the second refraction surface 122a and the reflection surface 123a, both of which are included in the lens element 120. Specifically, the lengths r, $L_1$, and $L_2$, and the angles $\beta_1$, $\beta_2$, $\alpha_1$, $\alpha_2$, $\alpha_2'$, and $\gamma$ satisfy equations (1) to (6) as described above.

Next, the second refraction surface 422b provided immediately surrounding the second refraction surface 422a as viewed from the optical axis 113 will be described. A light emitted from the light source 110 at an angle, smaller than the emission angle $\alpha_1$, representing an angle between the optical axis 113 and the emission direction, is reflected at a second reflection point Pb on the reflection surface 423. The reflected light is directed to the second refraction surface 422b, refracted at a second refraction point Qb on the second refraction surface 422b, and emitted as an emission light in the direction parallel to the optical axis 113.

$\alpha_{2_b}$ represents an angle, at the second refraction point Qb, between the reflected light reflected at the second reflection point Pb, and a line obtained by extending, toward the inside of the lens element 420, the emission light obtained by refracting the reflected light at the second refraction point Qb. Further, $\beta_{2_b}$ represents an angle, at the second refraction point Qb, between a straight line parallel to the optical axis 113, and a line obtained by extending a line of the inclined surface of the second refraction surface 422b outward from the lens element 420. In this case, when angles $\alpha_{2_b}$ and $\beta_{2_b}$ satisfy equation (7), the emission light refracted at the second refraction point Qb is parallel to the optical axis 113.

$$n_3 \cdot \sin(\pi/2 - \beta_{2_b}) = n_2 \cdot \sin(\pi/2 - \beta_{2_b} - \alpha_{2_b}) \quad (7)$$

Figure 9:
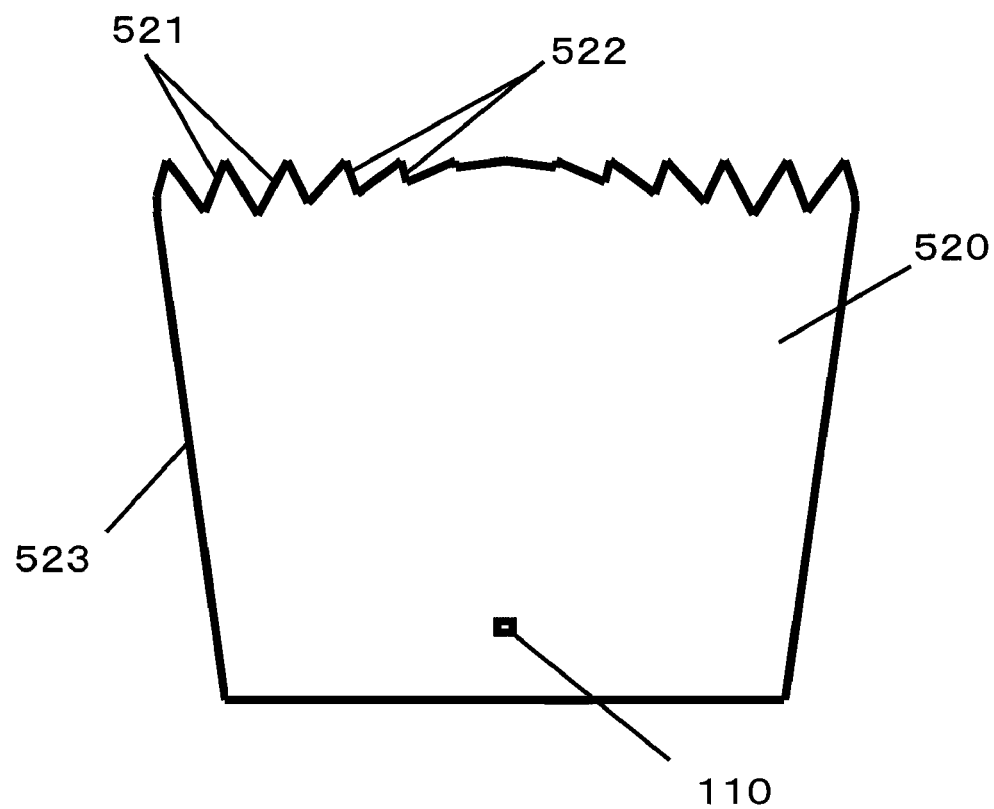
FIG. 9 is a side cross-sectional view of a principal portion of an exemplary modification of the light emitting module according to the first embodiment of the present invention.

Further, a lens element 520 shown in FIG. 9 may be provided so as to enclose the light source 110, instead of the lens element 420 shown in FIG. 7. On the emission surface of the lens element 520, a plurality of first refraction surfaces 521 and a plurality of second refraction surfaces 522 are alternately provided, and a reflected light from a reflection surface 523 is refracted and emitted by the plurality of second refraction surfaces 522, thereby producing the same effect as described above. Needless to say, a relationship between the plurality of second refraction surfaces 522 and the reflection surface 523 is the same as the relationship between the plurality of second refraction surfaces 422 and the reflection surface 423, both of which are included in the lens element 420, that is, equations (1) to (7) described above are satisfied.

Second Embodiment

In the first embodiment, a light emitted from the light source at an emission angle, ranging from $\theta_0$ to $\theta_1$, representing an angle between the optical axis and the emission direction is utilized so as to reduce variations in brightness of an emitted light, thereby realizing the light emitting module enabling highly efficient performance. According to the second embodiment, a light which is emitted from the light source but does not directly reach the lens element is utilized instead of the light emitted from the light source at the emission angle, ranging from $\theta_0$ to $\theta_1$, representing the angle between the optical axis and the emission direction.

Figure 10:
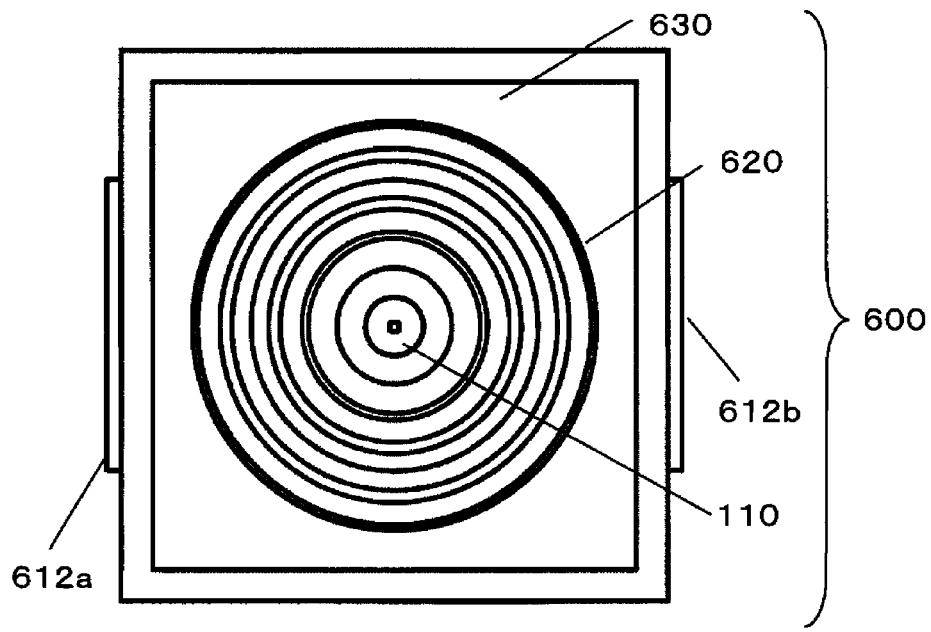
FIG. 10 is a top view of a light emitting module according to a second embodiment of the present invention.
Figure 11:
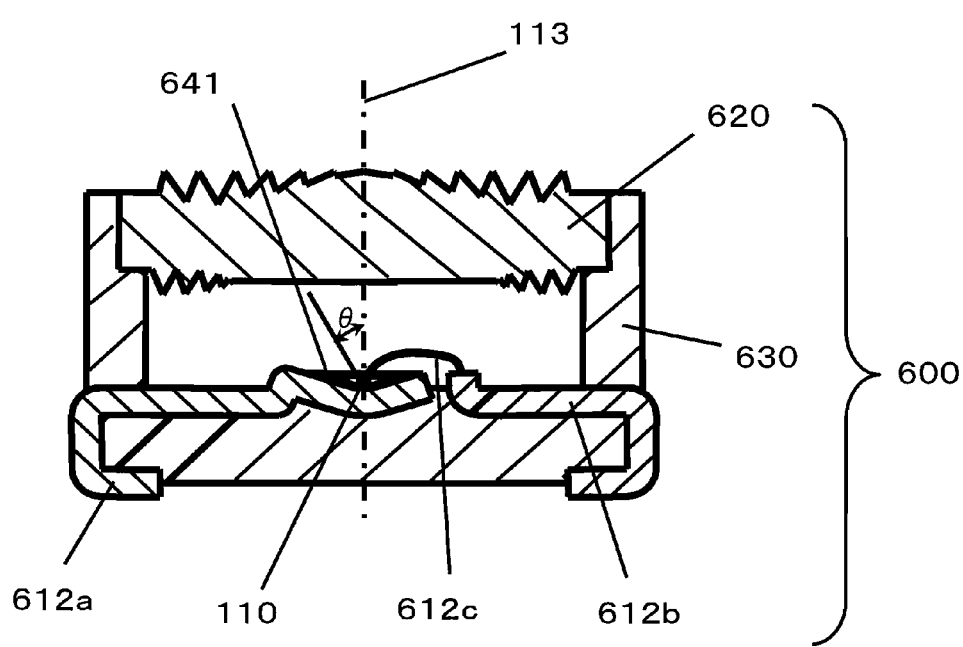
FIG. 11 is a side cross-sectional view of the light emitting module according to the second embodiment of the present invention.
Figure 12:
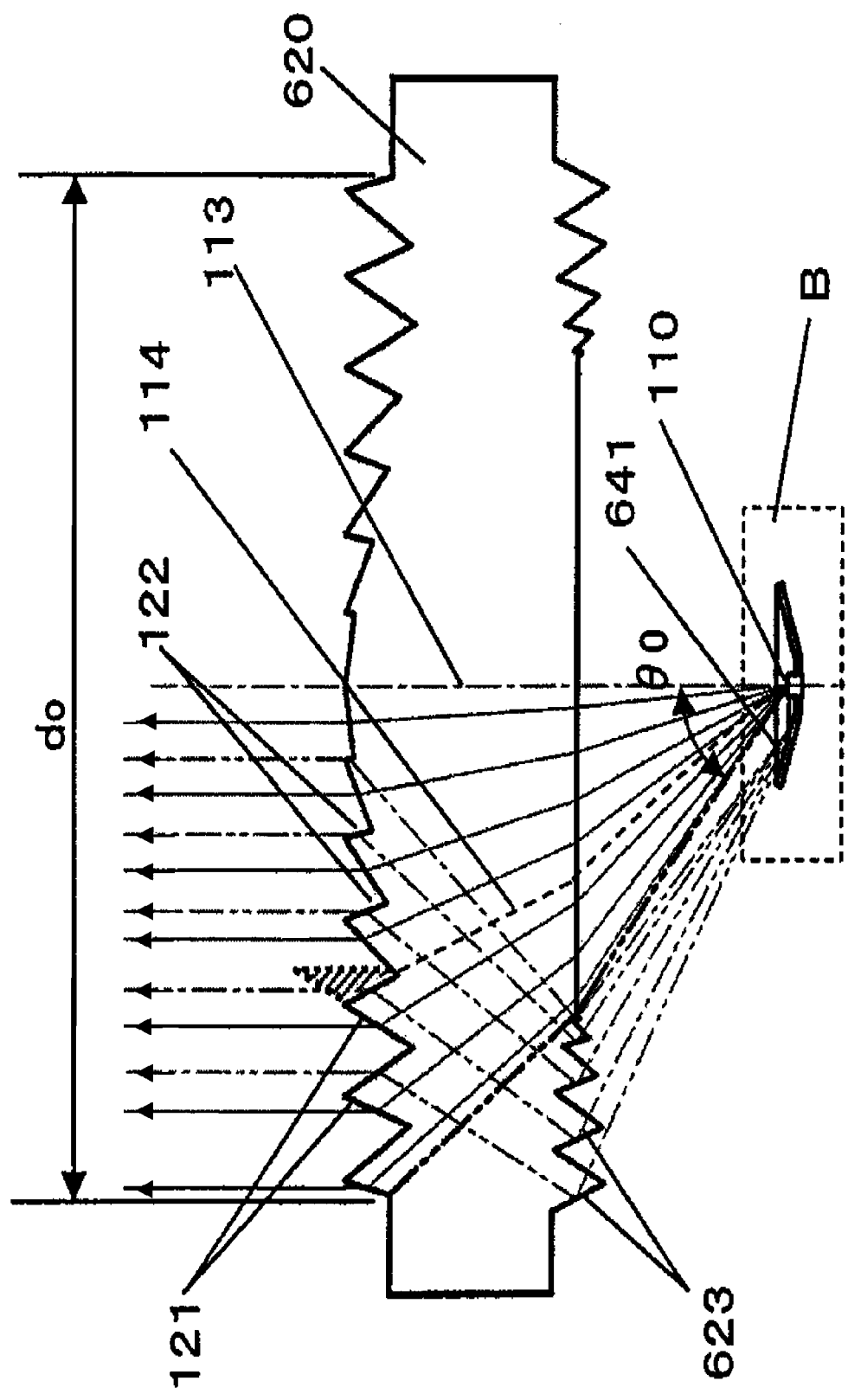
FIG. 12 is a side cross-sectional view of a principal portion of the light emitting module according to the second embodiment of the present invention.
Figure 13:
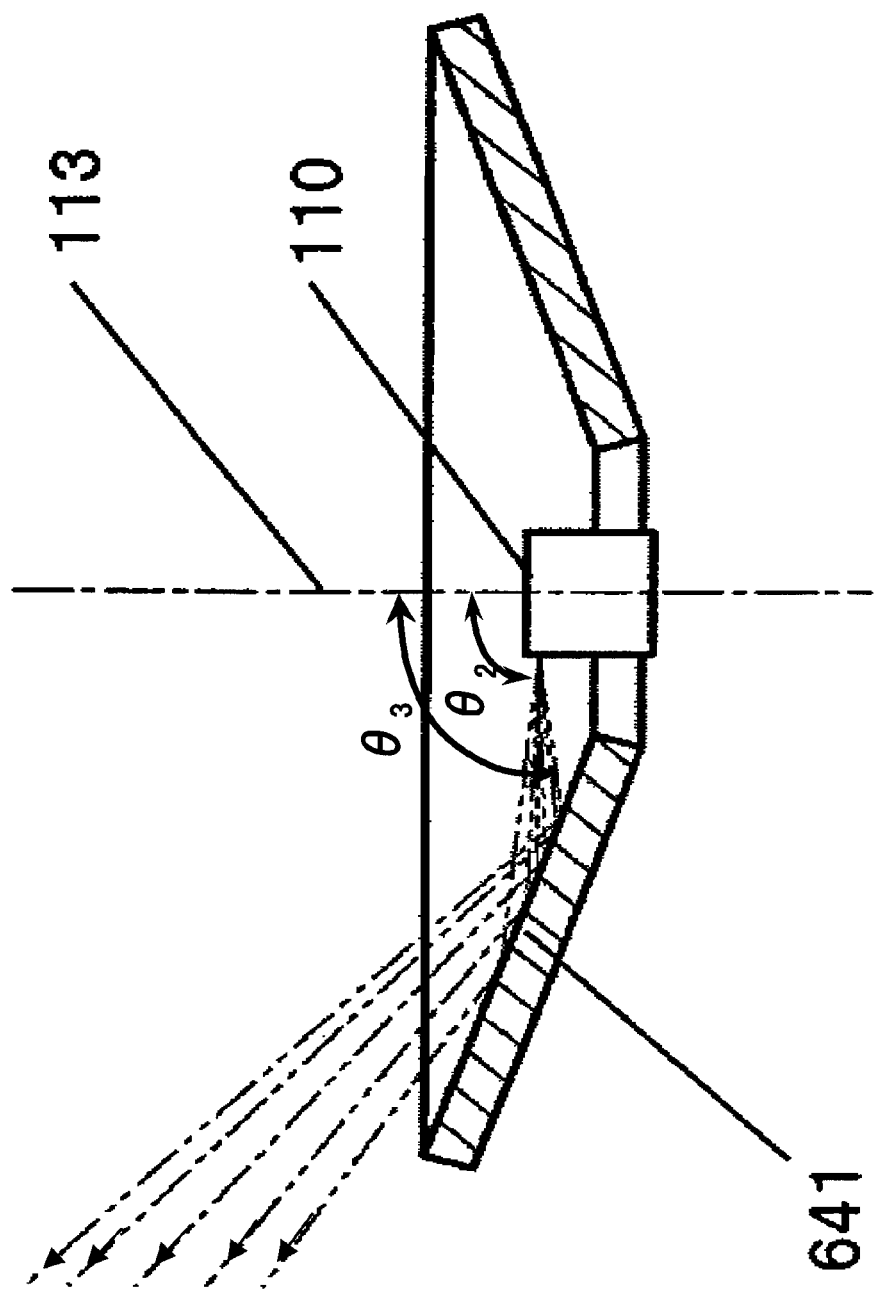
FIG. 13 is an enlarged side cross-sectional view of a principal portion of the light emitting module according to the second embodiment of the present invention.

FIG. 10 is a top view of a light emitting module 600 according to a second embodiment of the present invention, and FIG. 11 is a side cross-sectional view of the light emitting module 600 according to the second embodiment of the present invention. FIG. 12 is a side cross-sectional view of a principal portion of the light emitting module 600 according to the second embodiment of the present invention. FIG. 13 is an enlarged view of the B portion of the light emitting module 600 shown in FIG. 12. In FIGS. 10 to 13, components common to those shown in FIG. 1 and FIG. 2 are denoted by the same corresponding reference numerals, and the description thereof is not given.

As shown in FIGS. 10 to 13, the light emitting module 600 mainly comprises the light source 110 and a lens element 620. The light source 110 is, for example, a LED. The light source 110 is bonded to a cathode electrode 612a, and electrically connected to an anode electrode 612b by a wire 612c. The lens element 620, the cathode electrode 612a, and the anode electrode 612b are fixed to a housing 630 made of resin and/or the like. Further, the cathode electrode 612a includes a reflector 641. The reflector 641 has a light reflection surface forming an internal shape of, for example, an inverted cone. The reflector 641 may be fixed on the cathode electrode 612a. Alternatively, the reflector 641 may be made of the same material as the cathode electrode 612a so as to be integrated with the cathode electrode 612a.

On an emission surface of the lens element 620, as with the lens element 120 shown in FIG. 2, the plurality of first refraction surfaces 121 and the plurality of second refraction surfaces 122 are alternately provided so as to form concentric circles each having the optical axis 113 at the center thereof, and having diameters different from each other. On an incident surface of the lens element 620, a plurality of reflection surfaces 623 are provided so as to form concentric circles each having the optical axis 113 at the center thereof, and having diameters different from each other. Further, the plurality of reflection surfaces 623 are a plurality of total reflection surfaces. The light emitting module 600 according to the second embodiment has the same configuration as the light emitting module according to the first embodiment except that the light emitting module 600 has the reflector 641 for reflecting a light emitted from the sides of the light source 110, that is, a light emitted from the light source at an emission angle, ranging from $\theta_2$ to $\theta_3$, representing to an angle between the optical axis 113 and the emission direction. The reflector 641 reflects the light emitted from the sides of the light source 110, and the reflected light is directed to the plurality of reflection surfaces 623 provided on the incident surface of the lens element 620. The plurality of reflection surfaces 623 interact with the plurality of second refraction surfaces 122 in a substantially one-to-one corresponding manner, and therefore the reflected light directed by the reflector 641 is reflected toward the plurality of second refraction surfaces 122 in accordance with the one-to-one correspondence. The plurality of second refraction surfaces 122 refract the reflected light and emit the refracted light from the lens element 620. As described above, according to the first embodiment described with reference to FIG. 2, a light emitted at the emission angle ranging from $\theta_0$ to $\theta_1$ shown in FIG. 2 is utilized, whereas, according to the second embodiment, a light emitted from the sides of the light source 110 is utilized. Specifically, when a LED is used as the light source 110, a light emitted from the sides of the LED provides large electric power, and therefore the electric power of the light emitted from the sides of the light source can be utilized so as to enhance efficiency of the light emitting module 600. The plurality of reflection surfaces 623 interact with the plurality of second refraction surfaces 122 in the substantially one-to-one corresponding manner, and the light emitted from the sides of the light source 110 is reflected toward the plurality of second refraction surfaces 122 in accordance with the one-to-one correspondence. The plurality of second refraction surfaces 122 refract the reflected light, and emit the refracted light from the lens element 620. In this case, angles of the plurality of reflection surfaces 623 are set such that the light is emitted from the lens element 620 at desired angles (in FIG. 12, such that the light is parallel to the optical axis 113).

The plurality of second refraction surfaces 122, the plurality of reflection surfaces 623, and the reflector 641 are thus formed, and therefore a light emitted from the sides of the light source 110 is emitted from a portion corresponding to the dark portion shown in FIG. 29, thereby enabling reduction of variations in brightness of the emitted light. Further, not only a light emitted from the light source 110 at the emission angle smaller than or equal to $\theta_0$ but also a light emitted from the sides of the light source 110 is emitted from an area of diameter do of the plurality of first refraction surfaces 121, thereby enhancing a density of an emission power within the area of the diameter do and realizing the light emitting module 600 enabling efficient performance.

As described above, according to the second embodiment, the plurality of first refraction surfaces 121 and the plurality of second refraction surfaces 122 are alternately provided on the emission surface of the lens element 620 so as to form concentric circles each having the optical axis 113 at the center thereof, and having diameters different from each other, and the plurality of reflection surfaces 623 are provided on the incident surface of the lens element 620 so as to form concentric circles each having the optical axis 113 at the center thereof, and having diameters different from each other. Further, the reflector 641 is provided so as to surround the light source 110 such that the plurality of second refraction surfaces 122 are allowed to refract and emit the light from the sides of the light source 110 at desired angles. Therefore, it is possible to reduce variations in brightness of the emitted light, and enhance efficiency and an emission intensity without increasing the diameter of the lens element 620, thereby realizing the light emitting module 600 enabling advantageous performance.

According to the second embodiment described with reference to FIGS. 10 to 13, the light emitting module 600 is configured such that the reflector 641 and the plurality of reflection surfaces 623 are provided so as to direct the light from the sides of the light source 110 toward the plurality of second refraction surfaces 122. However, the present invention is not limited thereto. The reflector 641 may be replaced with an optical deflector, such as a prism, for performing deflection using refraction so as to deflect a light emitted from the light source 110 toward the plurality of reflection surfaces 623 as performed by the reflector 641.

Figure 14:
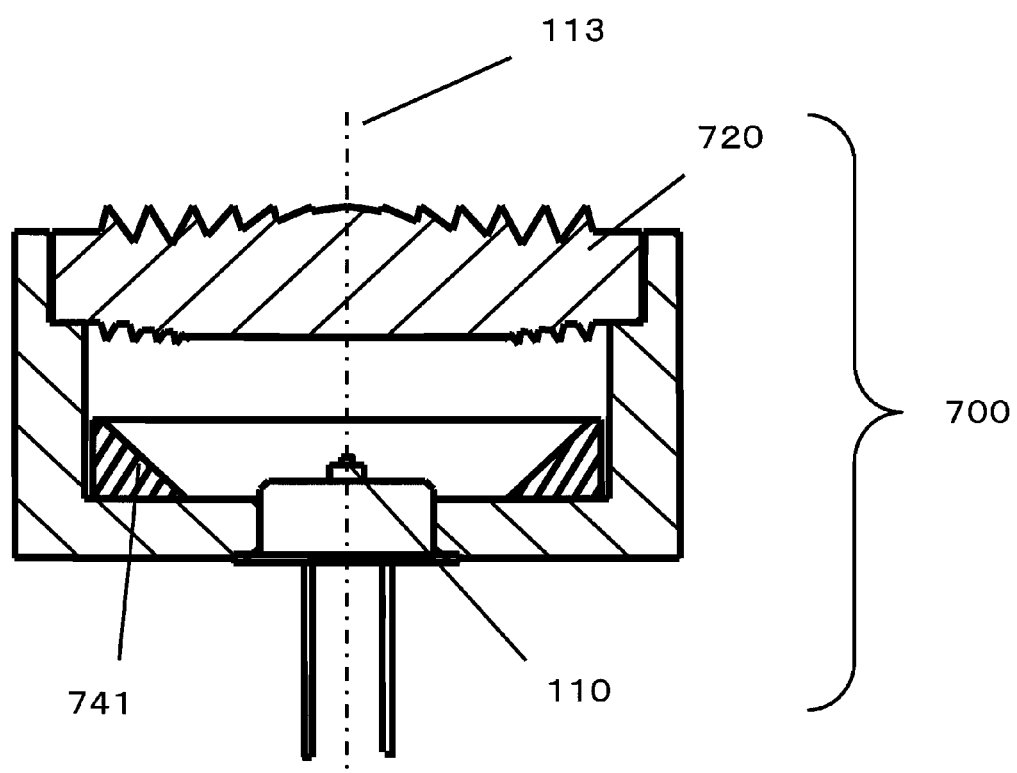
FIG. 14 is a side cross-sectional view of an exemplary modification of the light emitting module according to the second embodiment of the present invention.
Figure 15:
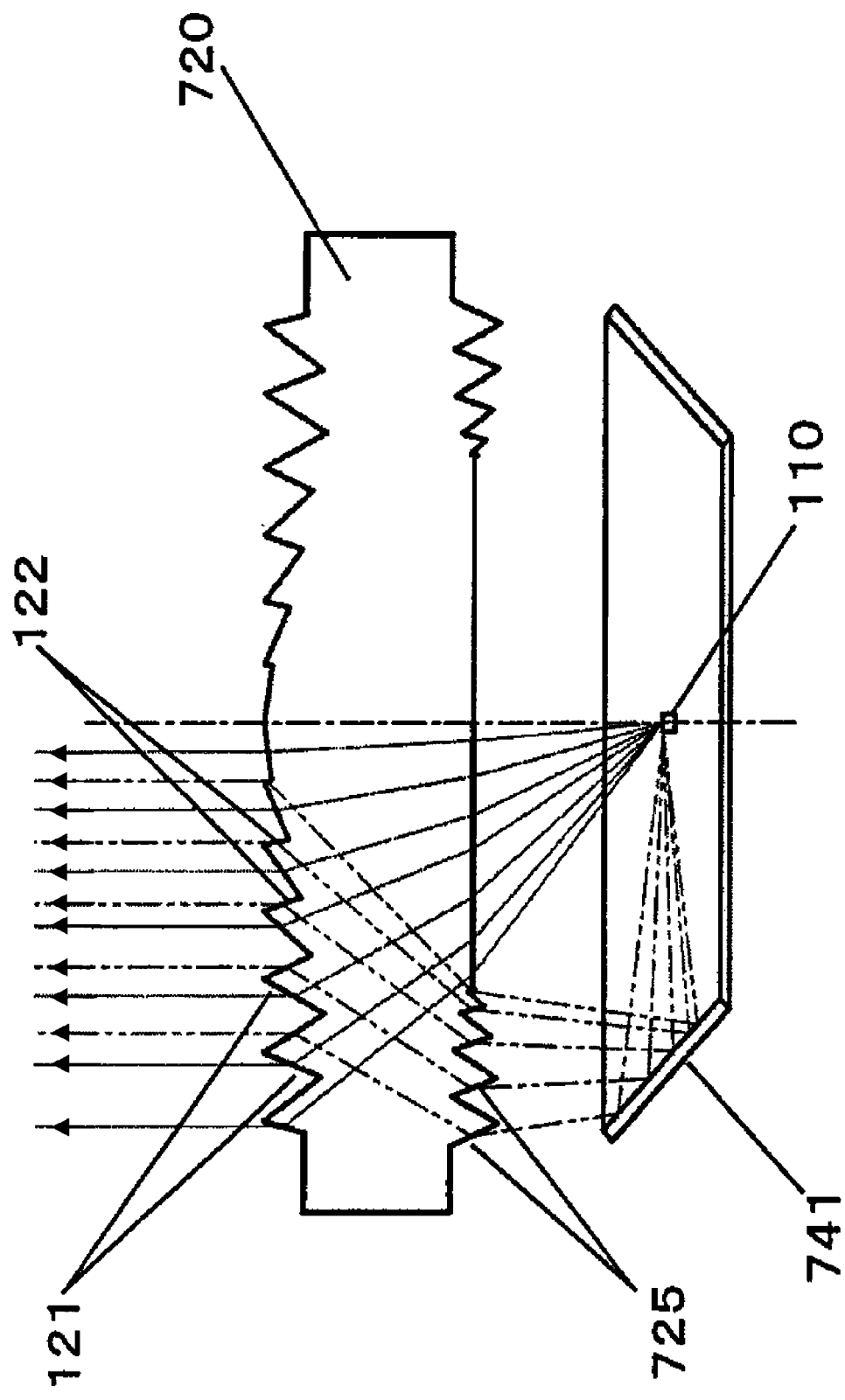
FIG. 15 is a side cross-sectional view of a principal portion of an exemplary modification of the light emitting module according to the second embodiment of the present invention.

Further, the plurality of reflection surfaces 623 may be replaced with the plurality of refraction surfaces. FIG. 14 is a side cross-sectional view of a light emitting module 700 including the plurality of refraction surfaces instead of the plurality of reflection surfaces 623. FIG. 15 is a side cross-sectional view of a principal portion of the light emitting module 700. As shown in FIG. 15, the light emitting module 700 is configured such that a reflected light from a reflector 741 is directed toward the plurality of second refraction surfaces 122 by using a plurality of third refraction surfaces 725 provided on an incident surface of the lens element 720. This configuration also allows the light from the sides of the light source 110 to be efficiently utilized, enhances efficiency and an emission intensity, and reduces variations in brightness of the emitted light.

The lens element 720 shown in FIG. 15 is configured such that the plurality of third refraction surfaces 725 are provided on the incident surface thereof. However, a lens element 820 shown in FIG. 16 maybe used in which a single third refraction surface 825 is used instead of the plurality of third refraction surfaces 725. In this case, a plurality of second refraction surfaces 822 may be each designed so as to have an appropriate angle with respect to the single third refraction surface 825. Thus, it is possible to reduce variations in brightness of the emitted light, and enhance efficiency and an emission intensity, thereby producing the same effect as described above.

Figure 16:
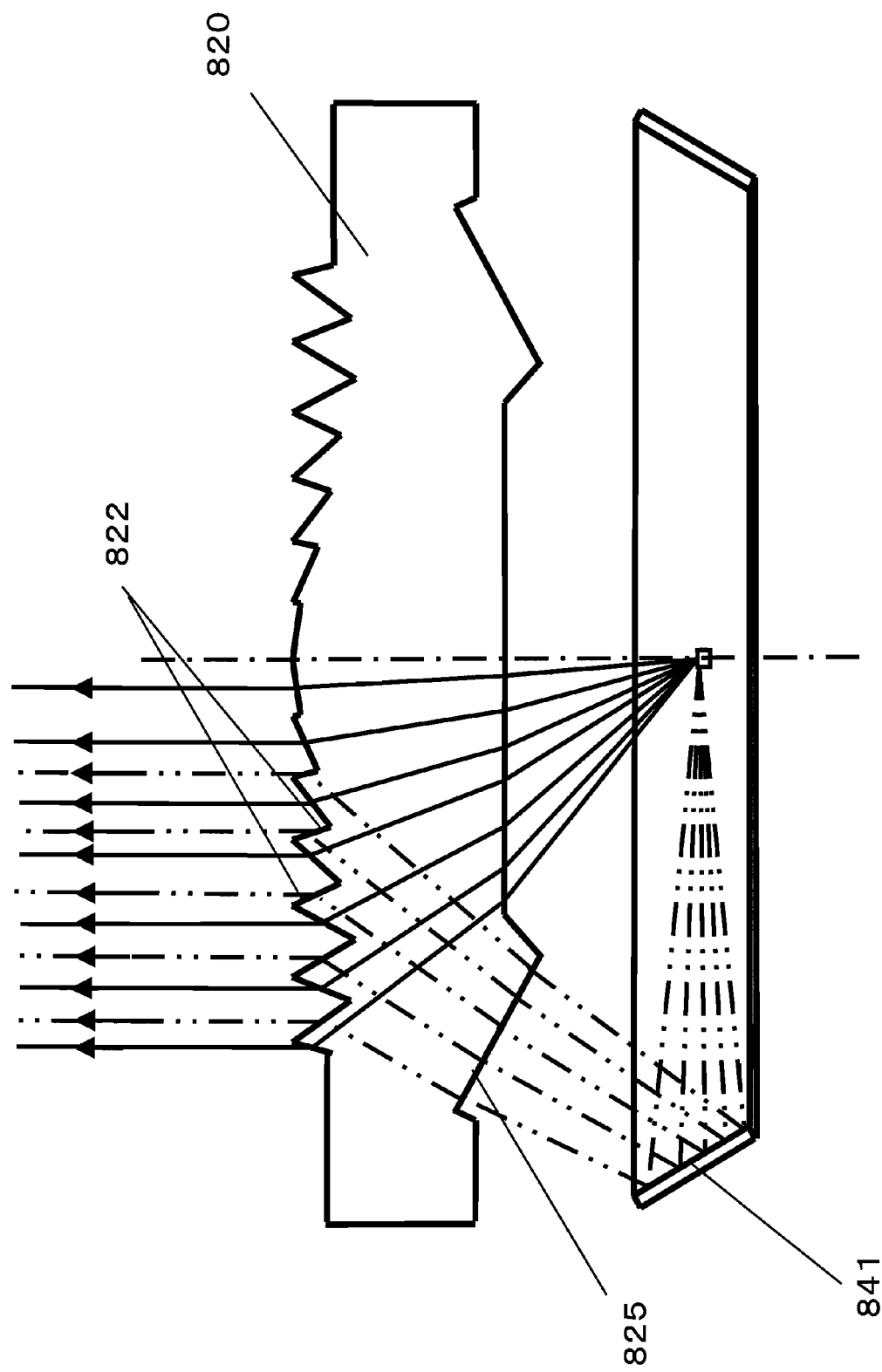
FIG. 16 is a side cross-sectional view of a principal portion of an exemplary modification of the light emitting module according to the second embodiment of the present invention.
Figure 17:
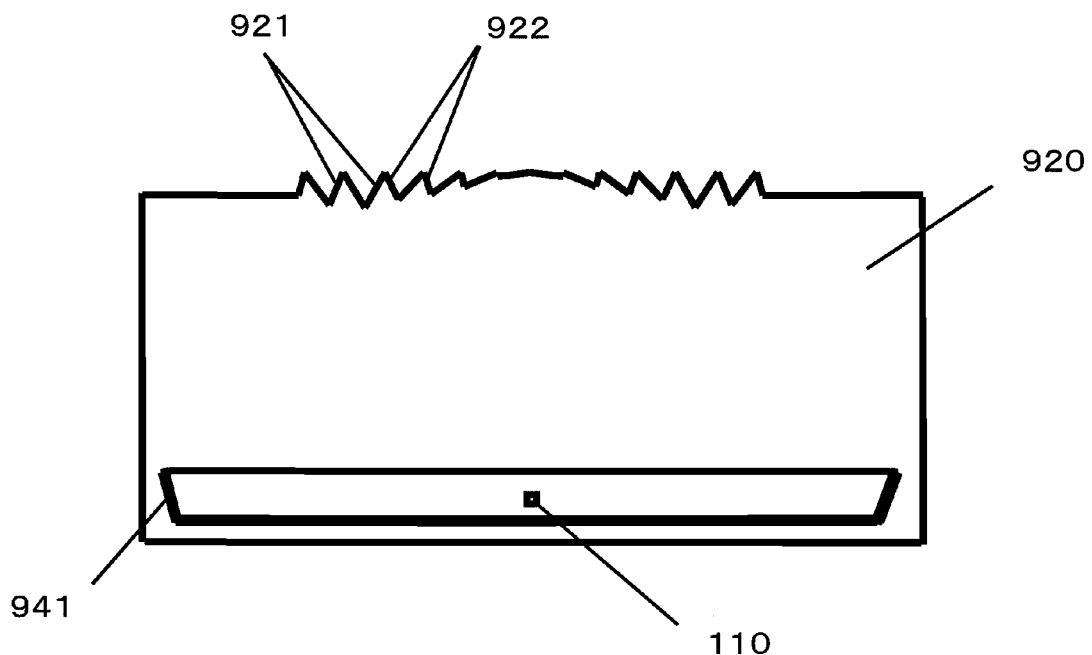
FIG. 17 is a side cross-sectional view of a principal portion of an exemplary modification of the light emitting module according to the second embodiment of the present invention.

Further, a lens element 920 shown in FIG. 17 may be used instead of the lens element 820 shown in FIG. 16 such that the lens element 920 encloses the light source 110 and a reflector 941. Also in this case, on an emission surface of the lens element 920, a plurality of first refraction surfaces 921 and a plurality of second refraction surfaces 922 are alternately provided, and a reflected light from the reflector 941 is refracted and emitted by the plurality of second refraction surfaces 922. Therefore, it is possible to efficiently use a light from the sides of the light source 110, reduce variations in brightness of the emitted light, and enhance efficiency and an emission intensity, thereby producing the same effect as described above.

Figure 18:
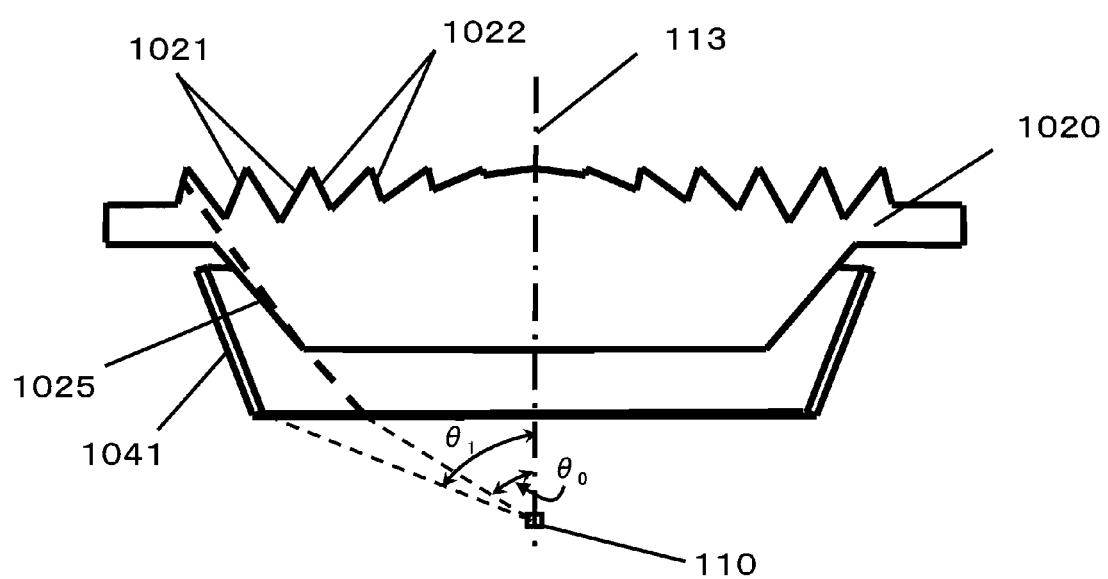
FIG. 18 is a side cross-sectional view of a principal portion of an exemplary modification of the light emitting module according to the second embodiment of the present invention.

Further, according to the second embodiment, the reflector reflects a light from the sides of the light source 110 so as to enhance efficiency of the light emitting module. However, as shown in FIG. 18, a reflector 1041 may reflect a light emitted from the light source 110 at the emission angle ranging from $\theta_0$ to $\theta_1$, and the reflected light may be incident on a single third refraction surface 1025 of the lens element 1020 so as to be refracted by a plurality of second refraction surfaces 1022, and the refracted light may be used, thereby reducing variations in brightness of the emitted light, and enhancing efficiency.

Third Embodiment

Figure 19:
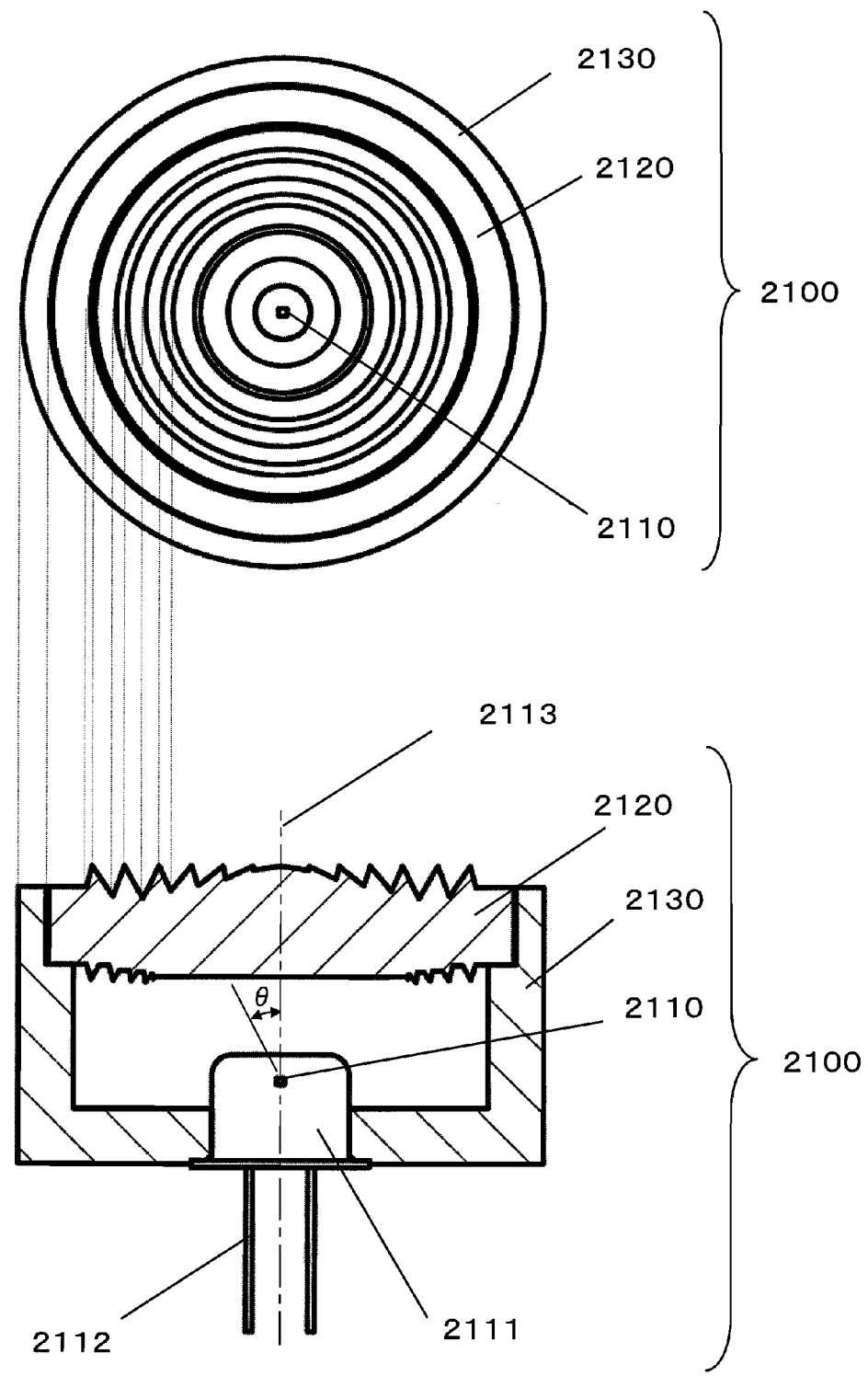
FIG. 19 is a top view and a side cross-sectional view of a light receiving module according to a third embodiment of the present invention.
Figure 20:
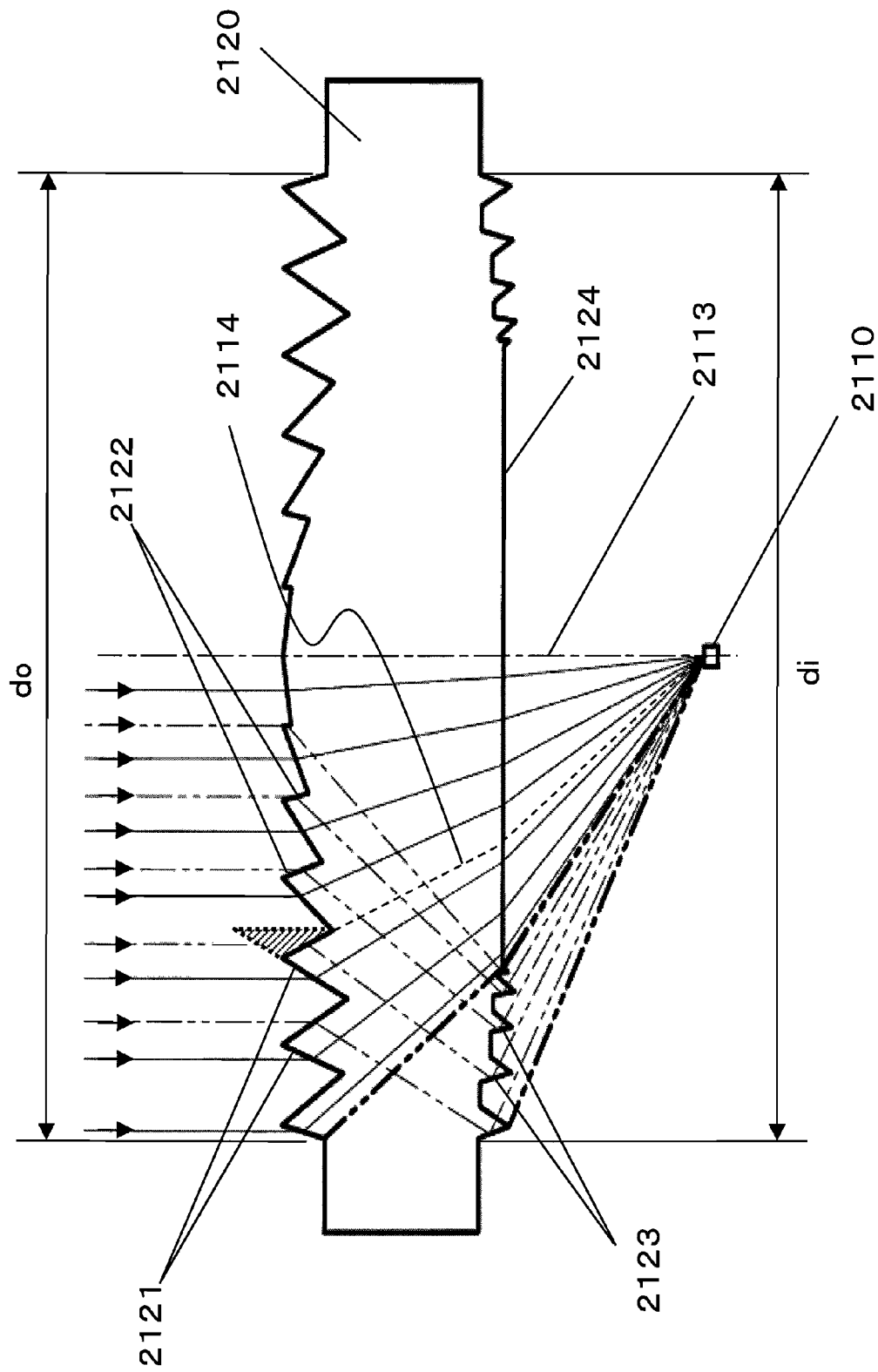
FIG. 20 is a side cross-sectional view of a principal portion of the light receiving module according to the third embodiment of the present invention.

FIG. 19 is a top view and a side cross-sectional view of a light receiving module 2100 according to a third embodiment of the present invention. FIG. 20 is a side cross-sectional view of a principal portion of the light receiving module 2100 according to the third embodiment of the present invention.

As shown in FIG. 19 and FIG. 20, the light receiving module 2100 mainly comprises a light receiving element 2110 and a lens element 2120. As the light receiving element 2110, for example, a photodiode (PD) is used. The light receiving element 2110 is accommodated in a package 2111. The package 2111 and the lens element 2120 are fixed, in a housing 2130, at such positions as to satisfy a predetermined positional relationship therebetween. The light receiving module 2100 receives a light signal (for example, a light signal emitted from the light emitting module 100 of the first embodiment) from an optical wireless transmitter (not shown) provided so as to face the light receiving module 2100.

Figure 30:
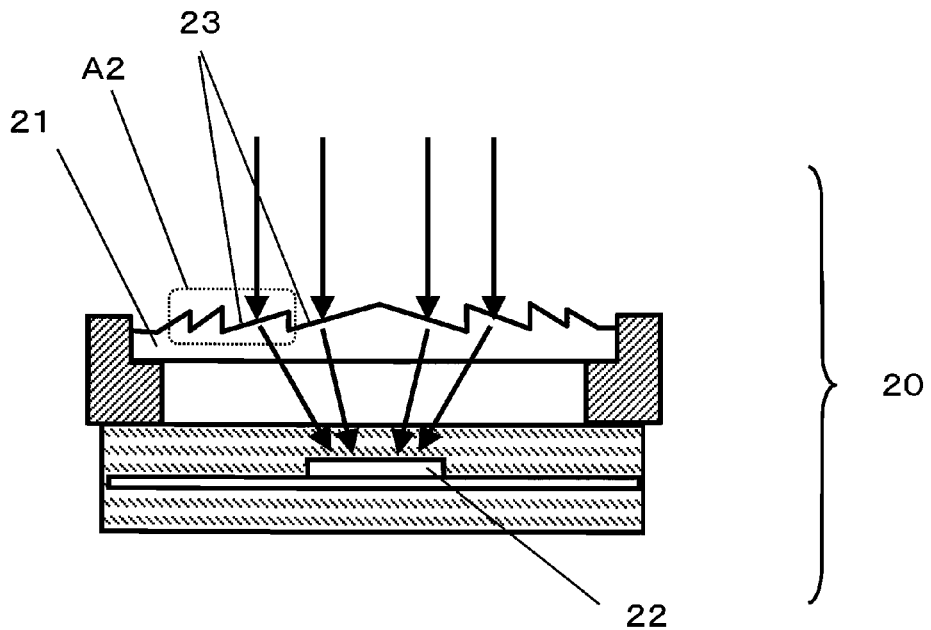
FIG. 30 is a side cross-sectional view of a conventional light receiving module.

The lens element 2120 collects, on the light receiving element 2110, an incident light. The light receiving element 2110 converts the received light signal to an electrical signal, and outputs the electrical signal from a terminal 2112, thereby realizing optical wireless transmission of information data. When inefficient collection of the incident light reduces power of the received light, the optical wireless transmission system provides only a reduced transmission distance. Therefore, the lens element 2120 is designed so as to enhance light collection efficiency. As shown in FIG. 20, the lens element 2120 has, on an incident surface thereof, a plurality of first refraction surfaces 2121 which are provided so as to form concentric circles each having the optical axis 2113 at the center thereof, and having diameters different from each other. The plurality of first refraction surfaces 2121 each refract a portion of the incident light so as to collect the incident light on the light receiving element 2110. FIG. 20 shows, as a simple example, a case where the incident light parallel to the optical axis 2113 is collected. That is, the plurality of first refraction surfaces 2121 act as a typical Fresnel lens. Thus, the plurality of first refraction surfaces 2121 are the same as used in the conventional light receiving module shown in FIG. 30.

Next, a difference between a conventional light receiving module and the light receiving module 2100 according to the third embodiment of the present invention will be described. The lens element 2120 of the light receiving module 2100 according to the third embodiment of the present invention has a plurality of second refraction surfaces 2122 formed on the incident surface of the lens element 2120, in addition of a lens of the conventional light receiving module. Further, a plurality of reflection surfaces 2123 are formed as a light direction section for collecting a light refracted by the plurality of second refraction surfaces so as to be directed toward the light receiving element.

The plurality of second refraction surfaces 2122 and the plurality of first refraction surfaces 2121 are alternately provided on the incident surface of the lens element 2120 so as to form concentric circles each having the optical axis 2113 at the center thereof. Lens surfaces of the plurality of second refraction surfaces 2122 have such a shape as to prevent the lens element 2120 from including a lens invalid portion (corresponding to diagonal line portions in FIG. 20) of the lens 21 of the conventional light receiving module shown in FIG. 30 and FIG. 31. That is, the lens element 2120 does not include an invalid portion which prevents the incident light from being collected on the light receiving element 2110.

The plurality of reflection surfaces 2123 are provided on the emission surface of the lens element 2120 so as to form concentric circles each having the optical axis 2113 at the center thereof, and having diameters different from each other. Further, the plurality of reflection surfaces 2123 are a plurality of total reflection surfaces. Further, the plurality of reflection surfaces 2123 are provided outside an area passing therethrough a light which is refracted by the plurality of first refraction surfaces 2121 so as to be collected on the light receiving element 2110. A light incident on the plurality of first refraction surfaces 2121 is refracted by the plurality of first refraction surfaces 2121, and collected on the light receiving element 2110. Therefore, when the light incident on the plurality of first refraction surfaces 2121 is collected on the light receiving element 2110, no loss of light occurs. The plurality of reflection surfaces 2123 interact with the plurality of second refraction surfaces 2122 in a substantially one-to-one corresponding manner. The plurality of second refraction surfaces 2122 refract the incident light toward the plurality of reflection surfaces 2123 in accordance with the one-to-one correspondence. The plurality of reflection surfaces 2123 reflect the refracted light toward the light receiving element 2110. In this case, angles of the plurality of reflection surfaces 2123 are set such that the light refracted by the plurality of second refraction surfaces 2122 is reflected toward the light receiving element 2110.

Figure 31:
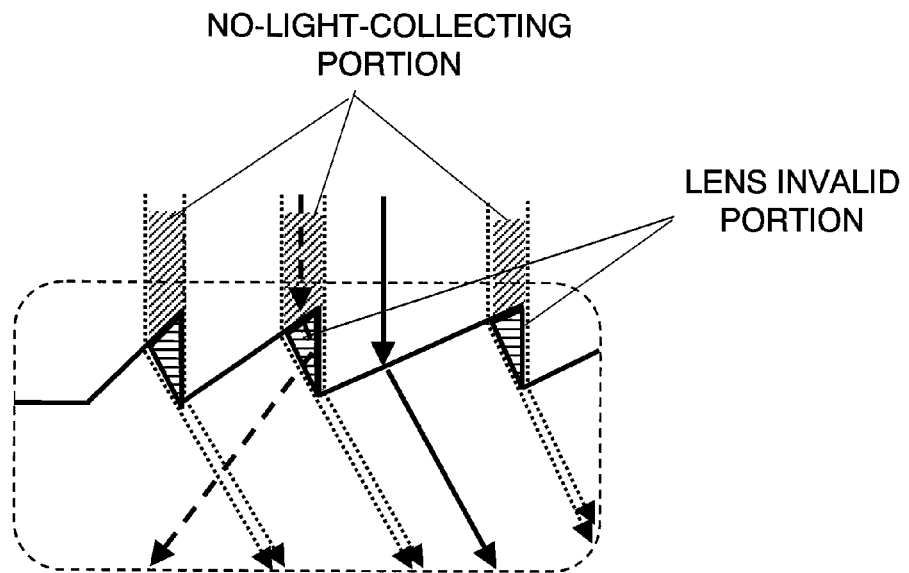
FIG. 31 is an enlarged side cross-sectional view of the A2 portion of the conventional light receiving module shown in FIG. 30.

As described above, the plurality of second refraction surfaces 2122 and the plurality of reflection surfaces 2123 are formed such that an incident light from the no-light-collecting portion shown in FIG. 31 is allowed to be collected on the light receiving element 2110, thereby realizing the light receiving module 2100 having enhanced light collection efficiency. Further, when a distance between the optical axis 2113 and the outermost circumference of the plurality of reflection surfaces 2123 is smaller than or equal to a distance between the optical axis 2113 and the outermost circumference of the plurality of first refraction surfaces 2121 (that is, the diameter di is smaller than or equal to the diameter do), it is possible to enhance light collection efficiency of the light receiving module 2100, as compared to a conventional typical Fresnel lens, without increasing the diameter of the lens element 2120. More specifically, in the conventional light receiving element passing a light therethrough in a reverse manner to a manner in which the conventional light emitting module shown in FIG. 28 passes a light therethrough, it is necessary to increase the diameter of the lens 12, because an incident light on the incident surface corresponding to a portion outward from the outermost circumference of the plurality of refraction surfaces 13 (that is, the portion outside an area of the diameter d1) is collected. On the other hand, according to the third embodiment, refracted is the incident light on the plurality of second refraction surfaces 2122 configured such that a distance between the optical axis 2113 and the outermost circumference of the plurality of second refraction surfaces 2122 is smaller than a distance between the optical axis 2113 and the outermost circumference (edges of diameter do) of the plurality of first refraction surfaces 2121, and the refracted light is reflected by the plurality of reflection surfaces 2123 so as to be collected. Therefore, it is possible to enhance the efficiency without increasing the diameter of the lens element 2120.

As described above, according to the third embodiment, the plurality of first refraction surfaces 2121 and the plurality of second refraction surfaces 2122 are alternately provided on the incident surface of the lens element 2120 so as to form concentric circles each having the optical axis 2113 at the center thereof, and having diameters different from each other, and the incident light on the plurality of second refraction surfaces 2122 is refracted toward the plurality of reflection surfaces 2123 which are provided on the emission surface of the lens element 2120 so as to form concentric circles each having the optical axis 2113 at the center thereof, and having diameters different from each other, and the plurality of reflection surfaces 2123 reflect the refracted light toward the light receiving element 2110. Therefore, the incident light on a portion corresponding to the no-light-collecting portion of the Fresnel lens can be collected on the light receiving element 2110, so that it is possible to realize the light receiving module 2100 providing advantageous performance and having its light collection efficiency enhanced without increasing the diameter of the lens element 2120.

Further, a light incident on the light receiving module of the third embodiment passes therethrough in a reverse manner to a manner in which a light to be emitted from the light emitting module of the first embodiment passes therethrough. Therefore, the light emitting module of the first embodiment may be applied to the light receiving module of the third embodiment.

Angles of lens surfaces of the plurality of second refraction surfaces 2122 and the plurality of reflection surfaces 2123, both of which are included in the lens element 2120 of the light receiving module according to the third embodiment, can be designed in the same manner as used for the lens element 120 as shown in FIG. 3. Further, the plurality of reflection surfaces 2123 may be a plurality of total reflection surfaces, as with the plurality of reflection surfaces 123. Alternatively, the plurality of reflection surfaces may be, for example, metal-plated so as to form the plurality of reflection surfaces 2123 enabling a desired performance.

The light receiving module of the third embodiment may be configured such that a light receiving element is fixedly provided on the package, as with the light emitting module shown in FIG. 4.

The lens element of the light receiving module of the third embodiment may be configured such that the distance between the optical axis 2113 and the outermost circumference of the plurality of reflection surfaces is larger than the distance between the optical axis 2113 and the outermost circumference of the plurality of first refraction surfaces, that is, the diameter di is larger than the diameter do, as with the lens element 220 shown in FIG. 5.

Figure 6:
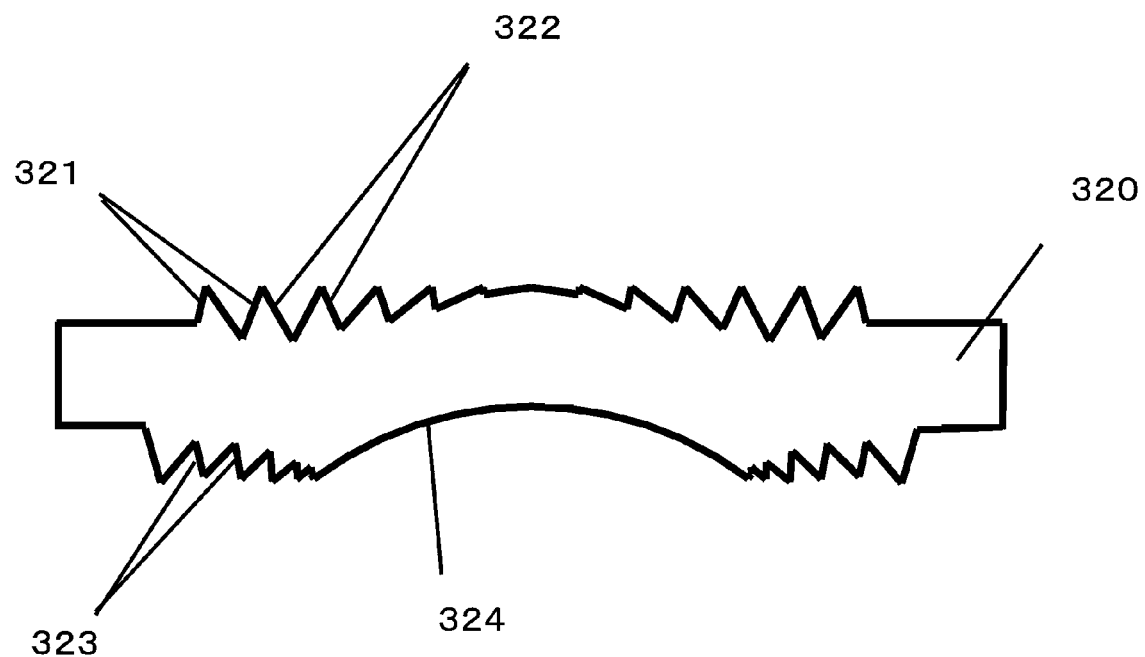
FIG. 6 is a side cross-sectional view of an exemplary modification of the lens element according to the first embodiment of the present invention.

On the lens element of the light receiving module of the third embodiment, the emission surface other than the plurality of reflection surfaces 2123 may include a curved surface, as with the lens element 320 shown in FIG. 6. Alternatively, other than the plurality of reflection surfaces 2123, the emission surface may include a Fresnel lens surface.

The lens element of the light receiving module of the third embodiment may have a single reflection surface instead of the plurality of reflection surfaces 2123, as with the lens element 420 shown in FIG. 7. In this case, angles of lens surfaces of the single reflection surface and the plurality of second refraction surfaces, both of which are included in the lens element of the light receiving module, may be designed in the same manner as used for the lens element 420 shown in FIG. 8.

The lens element of the light receiving module of the third embodiment may be configured such that the lens element encloses the light receiving element, as with the lens element 520 shown in FIG. 9.

Any of the configurations as described above can be used so as to realize the light receiving module enabling advantageous performance and having enhanced light collection efficiency.

Fourth Embodiment

Figure 21:
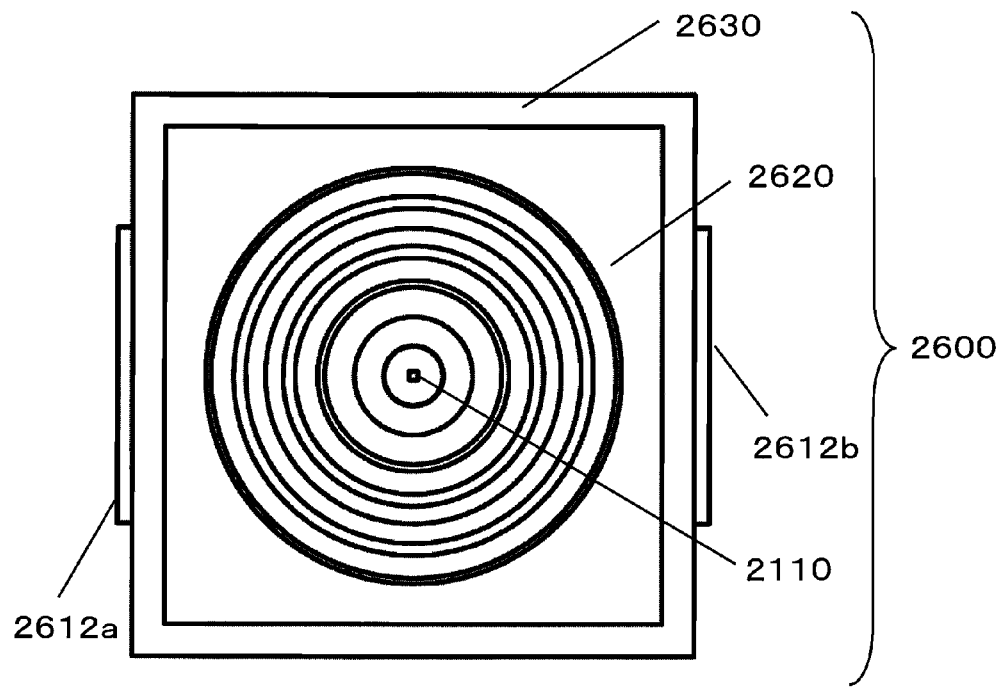
FIG. 21 is a top view of a light receiving module according to a fourth embodiment of the present invention.
Figure 22:
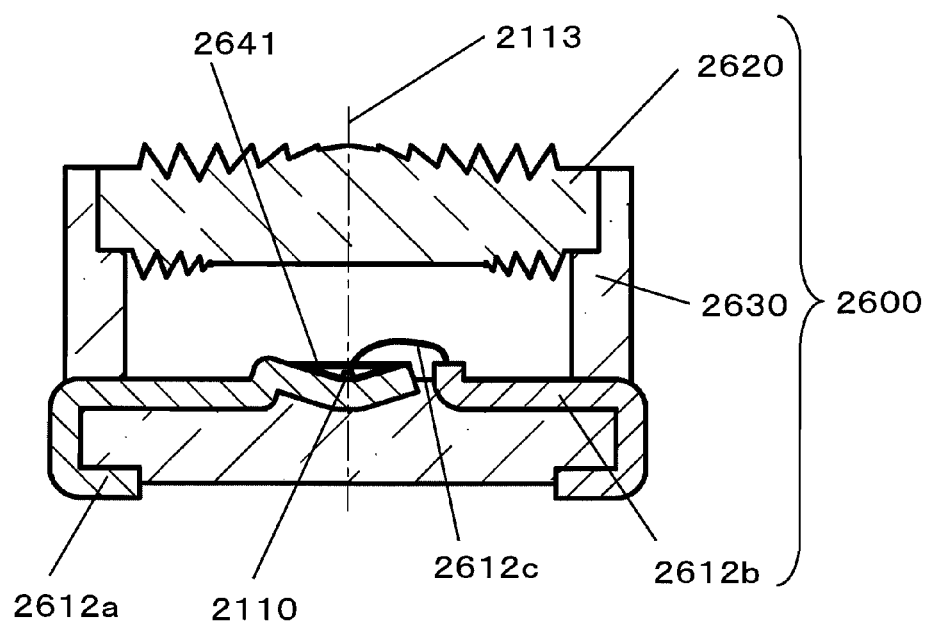
FIG. 22 is a side cross-sectional view of the light receiving module according to the fourth embodiment of the present invention.
Figure 23:
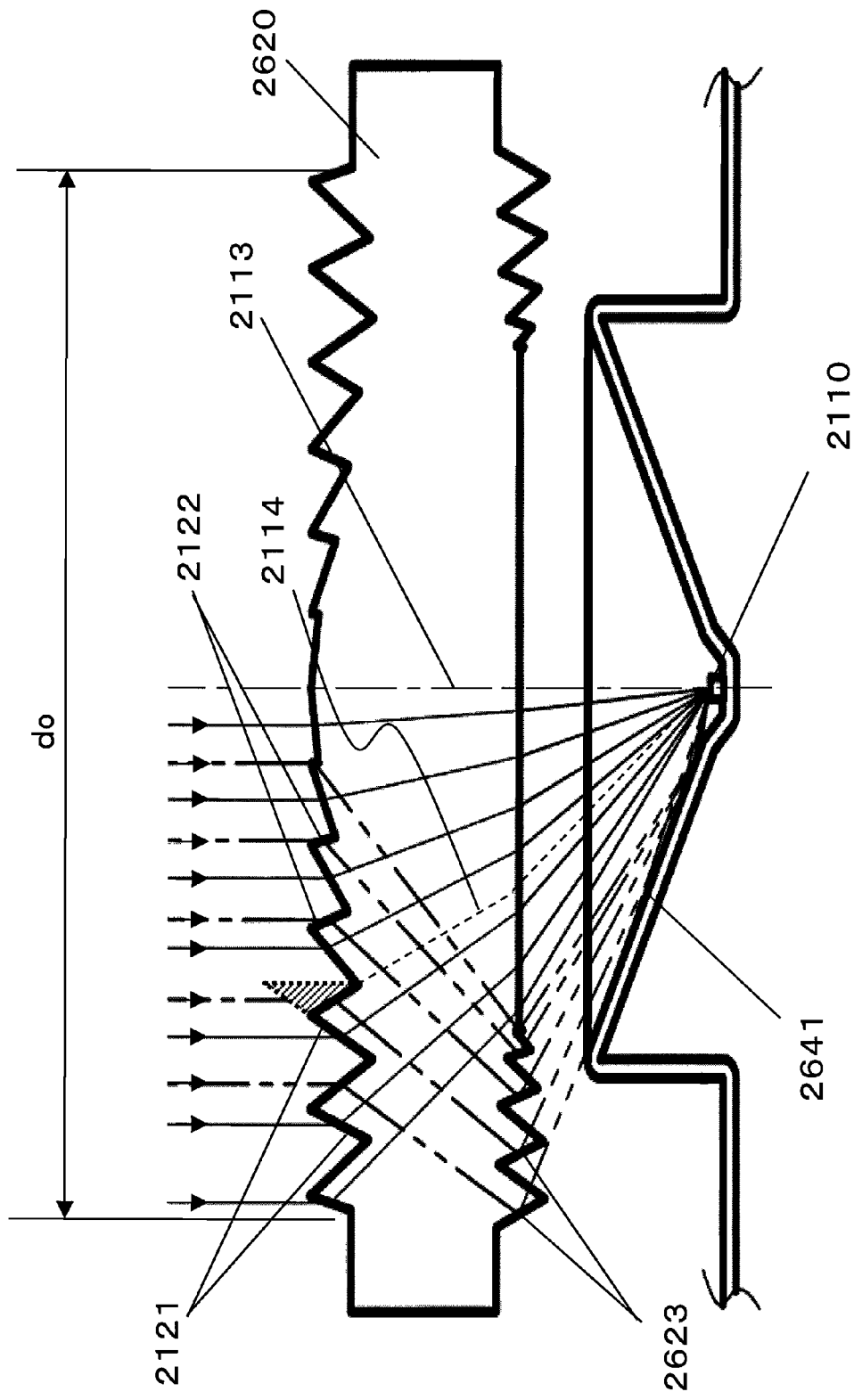
FIG. 23 is a side cross-sectional view of a principal portion of the light receiving module according to the fourth embodiment of the present invention.

FIG. 21 is a top view of a light emitting module 2600 according to a fourth embodiment of the present invention, and FIG. 22 is a side cross-sectional view of the light emitting module 2600 according to the fourth embodiment of the present invention. FIG. 23 is a side cross-sectional view of a principal portion of the light emitting module 2600 according to the fourth embodiment of the present invention. In FIGS. 21 to 23, components common to those shown in FIG. 19 and FIG. 20 are denoted by the same corresponding reference numerals, and the description thereof is not given.

As shown in FIGS. 21 to 23, the light receiving module 2600 mainly comprises the light receiving element 2110 and a lens element 2620. The light receiving element 2110 is, for example, a photodiode (PD). The light receiving element 2110 is bonded to an anode electrode 2612a, and electrically connected to a cathode electrode 2612b by a wire 2612c. The lens element 2620, the anode electrode 2612a, and the cathode electrode 2612b are fixed to a housing 2630 made of resin and/or the like. Further, the anode electrode 2612a include a reflector 2641. The reflector 2641 has a light reflection surface forming an internal shape of, for example, an inverted cone. The reflector 2641 may be fixed on the anode electrode 2612a. Alternatively, the reflector 2641 may be made of the same material as the anode electrode 2612a so as to be integrated with the anode electrode 2612a.

On an incident surface of the lens element 2620, as with the lens element 2120 shown in FIG. 20, the plurality of first refraction surfaces 2121 and the plurality of second refraction surfaces 2122 are alternately provided so as to form concentric circles each having the optical axis 2113 at the center thereof. On an emission surface of the lens element 2620, a plurality of reflection surfaces 2623 are provided so as to form concentric circles each having the optical axis 2113 at the center thereof, and having diameters different from each other. Further, the plurality of reflection surfaces 2623 are a plurality of total reflection surfaces. The light receiving module 2600 according to the fourth embodiment has the same configuration as the light receiving module according to the third embodiment except that the light receiving module 2600 has the reflector 2641 for further reflecting a light reflected by the plurality of reflection surfaces 2623. The plurality of reflection surfaces 2623 interact with the plurality of second refraction surfaces 2122 in a substantially one-to-one corresponding manner. The plurality of second refraction surfaces 2122 refract the incident light toward the plurality of reflection surfaces 2623 in accordance with the one-to-one correspondence. The plurality of reflection surfaces 2623 reflect the refracted light toward the reflector 2641. The reflector 2641 reflects the reflected light toward the light receiving element 2110. In this case, angles of the plurality of reflection surfaces 2623 are set such that the plurality of reflection surfaces 2623 reflect the light toward the light receiving element 2110 at a desired angle.

The plurality of second refraction surfaces 2122, the plurality of reflection surfaces 2623, and the reflector 2641 are thus formed so as to collect, on the light receiving element 2110, the incident light from the no-light-collecting portion shown in FIG. 31, as described for the third embodiment.

As described above, according to the fourth embodiment, the plurality of first refraction surfaces 2121 and the plurality of second refraction surfaces 2122 are alternately provided, on the incident surface of the lens element 2620, so as to form concentric circles each having the optical axis 2113 at the center thereof, and having diameters different from each other, and the plurality of reflection surfaces 2623 are provided on the emission surface of the lens element 2620, and further the reflector 2641 is provided so as to surround the light receiving element 2110, so that it is possible to collect, on the light receiving element 2110, the incident light from the no-light-collecting portion of the Fresnel lens. Therefore, the light receiving module 2600 enabling advantageous performance and having enhanced light collection efficiency while minimizing the diameter of the lens element 2620 can be realized.

According to the fourth embodiment described with reference to FIGS. 21 to 23, the light receiving module 2600 is configured such that the reflector 2641 and the plurality of reflection surfaces 2623 are provided so as to direct, toward the light receiving element 2110, incident light on the plurality of second refraction surfaces 2122. However, the present invention is not limited thereto. The reflector 2641 may be replaced with an optical deflector, such as a prism, for performing deflection using refraction so as to deflect a light reflected by the plurality of reflection surfaces 2623 toward the light receiving element 2110 as performed by the reflector 2641.

Further, a light incident on the light receiving module of the fourth embodiment passes therethrough in a reverse manner to a manner in which a light to be emitted from the light emitting module of the second embodiment passes therethrough. Therefore, the light emitting module of the second embodiment may be applied to the light receiving module of the fourth embodiment.

Figure 24:
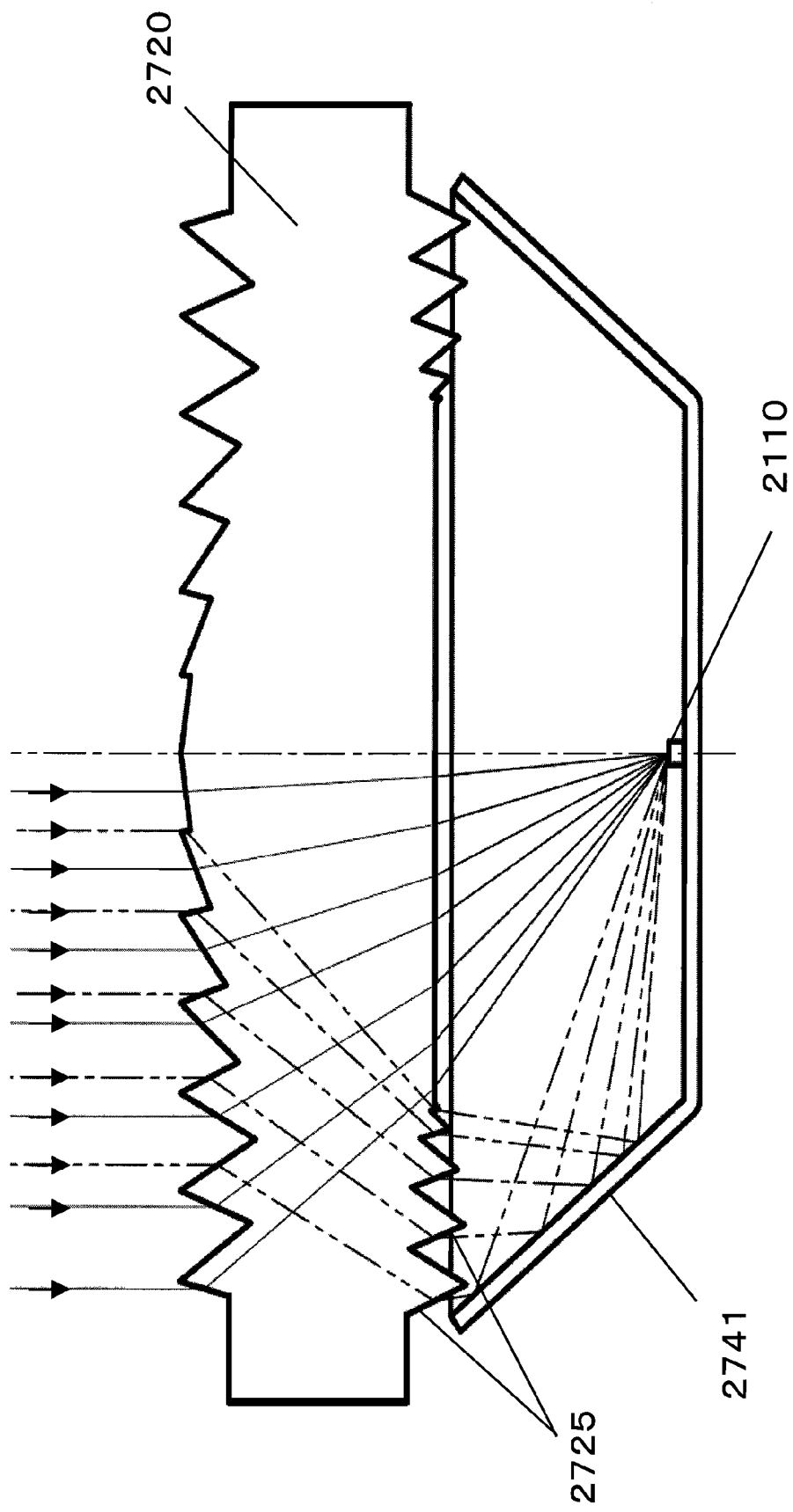
FIG. 24 is a side cross-sectional view of a principal portion of an exemplary modification of the light receiving module according to the fourth embodiment of the present invention.

The light receiving module of the fourth embodiment may have a lens element 2720 as shown in FIG. 24 in which a plurality of third refraction surfaces 2725 are provided instead of the plurality of reflection surfaces 2623. In this case, a reflector 2741 is provided so as to collect, on the light receiving element 2110, a light refracted by the plurality of third refraction surfaces 2725.

Figure 25:
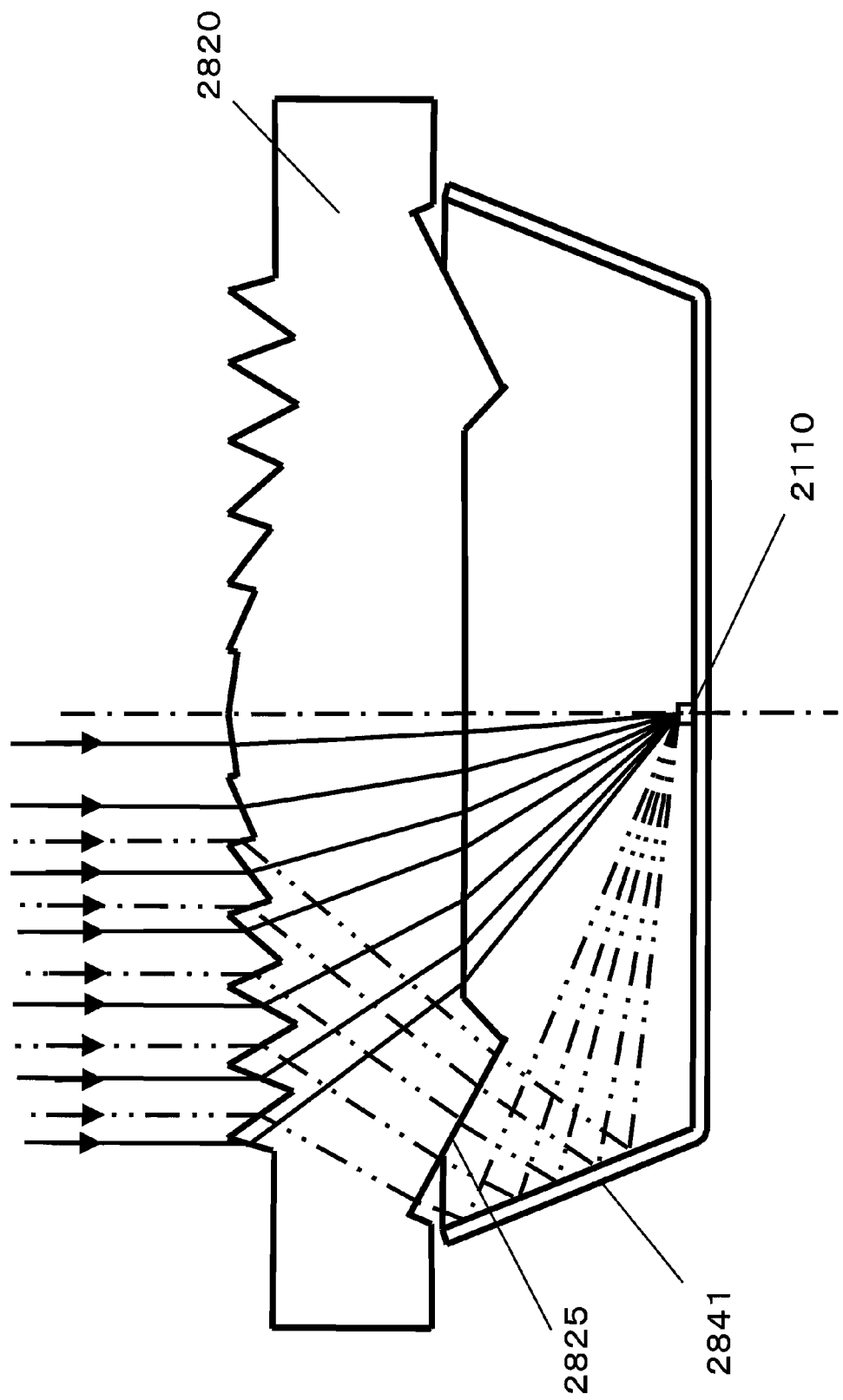
FIG. 25 is a side cross-sectional view of a principal portion of an exemplary modification of the light receiving module according to the fourth embodiment of the present invention.

The lens element 2720 shown in FIG. 24 has the plurality of third refraction surfaces 2725 on the emission surface of the lens element 2720. However, a lens element 2820 as shown in FIG. 25 may be provided in which a single third refraction surface 2825 is used instead of the plurality of third refraction surfaces 2725. In this case, a reflector 2841 is provided so as to collect, on the light receiving element 2110, a light refracted by the single third refraction surface 2825.

Figure 26:
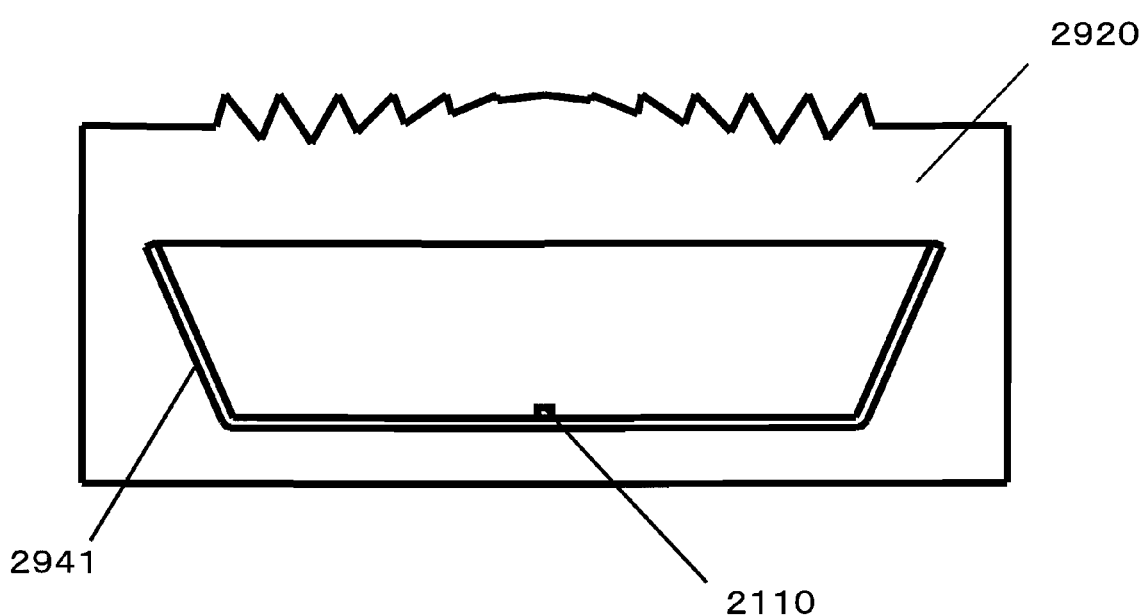
FIG. 26 is a side cross-sectional view of a principal portion of an exemplary modification of the light receiving module according to the fourth embodiment of the present invention.

Further, the lens element 2820 shown in FIG. 25 may be replaced with a lens element 2920 as shown in FIG. 26 which encloses the light receiving element 2110 and the reflector 2941.

Any of the configurations as described above can be used so as to realize the light receiving module enabling advantageous performance and having enhanced light collection efficiency.

In the above description, each of the embodiments described above is applied to an optical wireless transmission system. However, the present invention is not limited thereto. The light emitting module according to each of the first embodiment and the second embodiment is allowed to reduce variations in brightness with its thickness reduced, and to enhance efficiency and a density of radiation power. The light receiving module according to each of the third embodiment and the fourth embodiment is allowed to enhance light collection efficiency. Therefore, the present invention is efficiently applicable to another usage. For example, the present invention is applicable to lighting, an optical sensor using a light transmitted in a free space, and the like.

While the invention has been described in detail, the foregoing description is in all aspects illustrative and not restrictive. It is understood that numerous other modifications and variations can be devised without departing from the scope of the invention.

What is claimed is:

1. A light emitting module comprising a light source and a lens element for changing a light from the light source so as to have a predetermined direction, the lens element comprising:
    a plurality of first refraction surfaces, located on an emission surface of the lens element so as to form concentric circles of different diameters with each concentric circle having an optical axis at the center of the lens element, operable to refract the light which is emitted from the light source at an emission angle $\theta$, ranging from zero to $\theta_0$, so as to emit the light at a predetermined angle,
    a plurality of reflection surfaces, located on an incident surface of the lens element so as to form concentric circles of different diameters with each concentric circle having an optical axis at the center of the lens element, operable to reflect, to the emission surface of the lens element, the light emitted from the light source at an emission angle $\theta$, larger than $\theta_0$, and
    a plurality of second refraction surfaces, provided on the emission surface of the lens element so as to form concentric circles of different diameters with each concentric circle having an optical axis at the center of the lens element, operable to refract the light reflected by the plurality of reflection surfaces, so as to emit the light at a predetermined angle, wherein
    $\theta$ represents an angle between the optical axis and a direction in which the light is emitted from the light source,
    the plurality of second refraction surfaces and the plurality of first refraction surfaces are alternately positioned on the emission surface of the lens element, and
    the plurality of reflection surfaces reflect the light to the plurality of second refraction surfaces in a one-to-one manner.

2. The light emitting module according to claim 1, wherein the plurality of reflection surfaces includes at least one total reflection surface.

3. The light emitting module according to claim 1, wherein a distance between the optical axis and an outermost circumference of the outermost concentric circle of the reflection section is smaller than or equal to a distance between the optical axis and an outermost circumference of the outermost concentric circle of the plurality of first refraction surfaces.

4. A light emitting module comprising a light source and a lens element for changing a light from the light source so as to have a predetermined direction, the lens element comprising:
    a plurality of first refraction surfaces, located on an emission surface of the lens element so as to form concentric circles of different diameters with each concentric circle having an optical axis at the center of the lens element, operable to refract the light which is emitted from the light source at an emission angle $\theta$, ranging from zero to $\theta_0$, so as to emit the light at a predetermined angle,
    a refraction section operable to refract, to the emission surface of the lens element, the light emitted from the light source at an emission angle $\theta$, larger than $\theta_0$,
    a plurality of second refraction surfaces, provided on the emission surface of the lens element so as to form concentric circles of different diameters with each concentric circle having an optical axis at the center of the lens element, operable to refract the light refracted by the refraction section, so as to emit the light at a predetermined angle, a reflector for directing, to the refraction section, light emitted from the light source at an emission angle θ larger than $θ_0$, wherein θ represents an angle between the optical axis and a direction in which the light is emitted from the light source, and wherein the refraction section is a plurality of refraction surfaces provided on an incident surface of the lens element so as to form concentric circles having the optical axis at the center thereof, and having diameters different from each other, and the plurality of refraction surfaces interact with the plurality of second refraction surfaces in a substantially one-to-one corresponding manner.

5. The light emitting module according to claim 4, wherein the reflector reflects the light which is emitted at an emission angle θ, ranging from $θ_2$ to $θ_3$, where the light is prevented from directly reaching the lens element.

6. The light emitting module according to claims claim 4, wherein a distance between the optical axis and an outermost circumference of the outermost concentric circle of the refraction section is smaller than or equal to a distance between the optical axis and an outermost circumference of the outermost concentric circle of the plurality of first refraction surfaces.

7. A light emitting module comprising a light source and a lens element for changing a light from the light source so as to have a predetermined direction, the lens element comprising:

a plurality of first refraction surfaces, located on an emission surface of the lens element so as to form concentric circles of different diameters with each concentric circle having an optical axis at the center of the lens element, operable to refract the light which is emitted from the light source at an emission angle θ, ranging from zero to $θ_0$, so as to emit the light at a predetermined angle, a light direction section operable to direct, to the emission surface of the lens element, the light emitted from the light source at an emission angle θ, larger than $θ_0$, and a plurality of second refraction surfaces, provided on the emission surface of the lens element so as to form concentric circles of different diameters with each concentric circle having an optical axis at the center of the lens element, operable to refract the light directed by the light direction section, so as to emit the light at a predetermined angle, wherein θ represents an angle between the optical axis and a direction in which the light is emitted from the light source, the plurality of second refraction surfaces and the plurality of first refraction surfaces are alternately provided on the emission surface of the lens element, and the plurality of second refraction surfaces have such a shape as to remove, from the emission surface of the lens element, an invalid portion for preventing emission of an emission light emitted by the light source.

8. The light emitting module according to claim 7, wherein the light direction section is a reflection section operable to reflect the light emitted by the light source at the emission angle θ, larger than $θ_0$.

9. The light emitting module according to claim 8, wherein the reflection section is a plurality of reflection surfaces, located on an incident surface of the lens element so as to form concentric circles of different diameters with each concentric circle having an optical axis at the center of the lens element, and the plurality of reflection surfaces reflect the light to the plurality of second refraction surfaces in a one-to-one manner.

10. The light emitting module according to claim 9, wherein a distance between the optical axis and an outermost circumference of the outermost concentric circle of the light direction section is smaller than or equal to a distance between the optical axis and an outermost circumference of the outermost concentric circle of the plurality of first refraction surfaces.

11. A light receiving module comprising a light receiving element and a lens element for collecting a light on the light receiving element, the lens element comprising:

a plurality of first refraction surfaces, located on an incident surface of the lens element so as to form concentric circles of different diameters with each concentric circle having an optical axis at the center of the lens element, operable to refract a first incident light so as to collect the first incident light on the light receiving element, a plurality of second refraction surfaces, located on the incident surface of the lens element so as to form concentric circles of different diameters with each concentric circle having an optical axis at the center of the lens element, operable to refract a second incident light, and a light direction section, located at a position to collect on the light receiving element, the second incident light refracted from the plurality of second refraction surfaces, wherein the light direction section does not interfere with the first incident light refracted by the plurality of first refraction surfaces, and the plurality of second refraction surfaces and the plurality of first refraction surfaces are alternately positioned on the incident surface of the lens element.

12. The light receiving module according to claim 11, wherein the light direction section is a reflection section operable to reflect the light refracted by the plurality of second refraction surfaces.

13. The light receiving module according to claim 12, wherein the reflection section includes at least one total reflection surface.

14. The light receiving module according to claim 12, wherein the reflection section is a single reflection surface which interacts with at least one of the plurality of second refraction surfaces.

15. The light receiving module according to claim 12, wherein the reflection section is a plurality of reflection surfaces, located on an emission surface of the lens element so as to form concentric circles of different diameters with each concentric circle having an optical axis at the center of the lens element, and the plurality of second refraction surfaces refract the light to the plurality of reflection surfaces in a one-to-one manner.

16. The light receiving module according to claim 15, wherein a distance between the optical axis and an outermost circumference of the outermost concentric circle of the light direction section is smaller than or equal to a distance between the optical axis and an outermost circumference of the outermost concentric circle of the plurality of first refraction surfaces.

17. The light receiving module according to claim 11, further comprising a reflector for collecting, on the light receiving element, the light directed by the light direction section.

18. The light receiving module according to claim 17, wherein the light direction section is a refraction section for refracting, to the reflector, the light refracted by the plurality of second refraction surfaces.

19. The light receiving module according to claim 18, wherein the refraction section is a single third refraction surface which refracts the light refracted from at least one of the plurality of second refraction surfaces.

20. The light receiving module according to claim 18, wherein the refraction section is a plurality of third refraction surfaces located on an emission surface of the lens element so as to form concentric circles of different diameters with each concentric circle having an optical axis at the center of the lens element, and the plurality of second refraction surfaces refract the light to the plurality of third refraction surfaces in a one-to-one manner.

21. The light receiving module according to claim 20, wherein a distance between the optical axis and an outermost circumference of the outermost concentric circle of the light direction section is smaller than or equal to a distance between the optical axis and an outermost circumference of the outermost concentric circle of the plurality of first refraction surfaces.

22. The light receiving module according to claim 11, wherein the plurality of second refraction surfaces are each shaped in a way that removes, from the incident surface of the lens element, an invalid portion for preventing the incident light from being collected on the light receiving element.

* * * * *